(12) United States Patent
Korthikanti et al.

(10) Patent No.: US 11,748,625 B2
(45) Date of Patent: Sep. 5, 2023

(54) DISTRIBUTED CONVOLUTION FOR NEURAL NETWORKS

(71) Applicant: Intel Corporation, Santa Clara, CA (US)

(72) Inventors: Vijay Anand R. Korthikanti, Milpitas, CA (US); Aravind Kalaiah, San Jose, CA (US); Tony L. Werner, Los Altos, CA (US); Carey K. Kloss, Los Altos, CA (US); Amir Khosrowshahi, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 1096 days.

(21) Appl. No.: 15/395,675

(22) Filed: Dec. 30, 2016

(65) Prior Publication Data

US 2018/0189652 A1    Jul. 5, 2018

(51) Int. Cl.
*G06N 3/084*    (2023.01)
*G06N 3/063*    (2023.01)
(Continued)

(52) U.S. Cl.
CPC .......... *G06N 3/084* (2013.01); *G06F 17/153* (2013.01); *G06F 17/16* (2013.01); *G06N 3/045* (2023.01); *G06N 3/063* (2013.01)

(58) Field of Classification Search
CPC ............ G06N 3/08; G06N 3/04; G06N 3/063; G06N 3/082; G06N 20/00
(Continued)

(56) References Cited

U.S. PATENT DOCUMENTS 5,321,639 A  *  6/1994  Krishnamoorthy .. G06N 3/0675
                                                            708/7
5,867,414 A      2/1999  Kao
(Continued)

OTHER PUBLICATIONS

Choi et al.—"Puma: Parallel universal matrix multiplication algorithms on distributed memory concurrent computers"—1994—https://onlinelibrary.wiley.com/doi/abs/10.1002/cpe.4330060702 (Year: 1994).*

(Continued)

*Primary Examiner* — Viker A Lamardo
(74) *Attorney, Agent, or Firm* — Hanley, Flight & Zimmerman, LLC

(57) ABSTRACT

In one embodiment, a matrix operation may be performed using a plurality of input matrices, wherein the matrix operation is associated with one or more convolution operations. The plurality of input matrices may be partitioned into a plurality of input partitions, wherein the plurality of input matrices is partitioned based on a number of available processing elements. The plurality of input partitions may be distributed among a plurality of processing elements, wherein each input partition is distributed to a particular processing element of the plurality of processing elements. A plurality of partial matrix operations may be performed using the plurality of processing elements, and partial matrix data may be transmitted between the plurality of processing elements while performing the plurality of partial matrix operations. A result of the matrix operation may be determined based on the plurality of partial matrix operations.

22 Claims, 14 Drawing Sheets

(51) Int. Cl.
*G06N 3/045* (2023.01)
*G06F 17/16* (2006.01)
*G06F 17/15* (2006.01)

(58) Field of Classification Search
USPC .......................................................... 706/25
See application file for complete search history.

(56) References Cited

U.S. PATENT DOCUMENTS

| | | | |
|---|---|---|---|
| 7,483,932 B1 | 1/2009 | Boucher | |
| 7,730,121 B2 * | 6/2010 | Howard | G06F 15/163 709/201 |
| 8,356,086 B2 | 1/2013 | Liu et al. | |
| 9,424,076 B1 | 8/2016 | Anderson et al. | |
| 10,169,296 B2 | 1/2019 | Korthikanti et al. | |
| 10,198,401 B2 | 2/2019 | Lau et al. | |
| 10,228,937 B2 | 3/2019 | Werner et al. | |
| 10,922,380 B2 | 2/2021 | Korthikanti et al. | |
| 2002/0186721 A1 * | 12/2002 | Bohn | H04J 3/14 370/522 |
| 2005/0197977 A1 * | 9/2005 | Buck | G06N 20/00 706/12 |
| 2007/0028076 A1 * | 2/2007 | Wezelenburg | G06F 9/30036 712/22 |
| 2009/0300091 A1 | 12/2009 | Brokenshire et al. | |
| 2011/0107060 A1 | 5/2011 | McAllister et al. | |
| 2011/0119467 A1 * | 5/2011 | Cadambi | G06N 20/10 712/27 |
| 2011/0246573 A1 | 10/2011 | Liu et al. | |
| 2011/0307685 A1 | 12/2011 | Song | |
| 2014/0289445 A1 * | 9/2014 | Savich | G06F 17/16 710/317 |
| 2016/0062947 A1 * | 3/2016 | Chetlur | G06F 17/153 708/420 |
| 2016/0162402 A1 * | 6/2016 | Woolley, Jr. | G06V 10/95 711/202 |
| 2017/0316312 A1 | 11/2017 | Goyal et al. | |
| 2017/0331886 A1 | 11/2017 | Huang et al. | |
| 2018/0188972 A1 | 7/2018 | Yang et al. | |
| 2018/0189057 A1 | 7/2018 | Werner et al. | |
| 2018/0189227 A1 | 7/2018 | Korthikanti et al. | |
| 2018/0189236 A1 * | 7/2018 | Korthikanti | G06N 3/0454 |
| 2018/0189237 A1 | 7/2018 | Werner et al. | |
| 2018/0189238 A1 | 7/2018 | Lau et al. | |
| 2019/0138569 A1 | 5/2019 | Korthikanti et al. | |

OTHER PUBLICATIONS

Zhou et al.—"Advanced partitioning techniques for massively distributed computation"—2012—https://dl.acm.org/doi/10.1145/2213836.2213839 (Year: 2012).*

Chen, Yunji et al., "DaDianNao: A Machine-Learning Supercomputer", 2014 47th Annual IEEE/ACM International Symposium on Microarchitecture; IEEE Computer Society; Washington, D.C., USA, Dec. 13, 2014, 14 pages.

Extended European Search Report for EP Application No. 17208104.4 dated Jun. 12, 2018, 20 pages.

U.S. Appl. No. 15/395,427, filed Dec. 30, 2016, 64 pages.
U.S. Appl. No. 15/395,527, filed Dec. 30, 2016, 76 pages.
U.S. Appl. No. 15/395,542, filed Dec. 30, 2016, 64 pages.
U.S. Appl. No. 15/395,654, filed Dec. 30, 2016, 61 pages.
U.S. Appl. No. 15/395,786, filed Dec. 30, 2016, 67 pages.
U.S. Appl. No. 15/395,906, filed Dec. 30, 2016, 68 pages.

EPO; Office Action issued in EP Patent Application No. 17208104.4, dated May 26, 2021; 6 pages.

European Patent Office, "Extended European Search Report," issued in connection with European Patent Application No. 21216141.8, dated Mar. 30, 2022, 10 pages.

United States Patent and Trademark Office, "Non-Final Office Action," issued in connection with U.S. Appl. No. 15/395,527, dated Apr. 20, 2018, 6 pages.

United States Patent and Trademark Office, "Final Office Action," issued in connection with U.S. Appl. No. 15/395,527, dated Jun. 15, 2018, 5 pages.

United States Patent and Trademark Office, "Notice of Allowance and Fee(s) Due," issued in connection with U.S. Appl. No. 15/395,527, dated Aug. 24, 2018, 6 pages.

United States Patent and Trademark Office, "Non-Final Office Action," issued in connection with U.S. Appl. No. 16/236,955, dated Feb. 3, 2020, 5 pages.

United States Patent and Trademark Office, "Final Office Action," issued in connection with U.S. Appl. No. 16/236,955, dated Jul. 30, 2020, 6 pages.

United States Patent and Trademark Office, "Notice of Allowance and Fee(s) Due," issued in connection with U.S. Appl. No. 16/236,955, dated Oct. 14, 2020, 5 pages.

* cited by examiner

FORWARD PROPAGATION: PARTITIONING

FORWARD PROPAGATION: PARTIAL CALCULATION 1 OF 4

WEIGHT UPDATE: PARTITIONING

WEIGHT UPDATE: PARTIAL OPERATION 1 OF 4

WEIGHT UPDATE: STAGE 1

WEIGHT UPDATE: STAGE 2

WEIGHT UPDATE: STAGE 3

WEIGHT UPDATE: STAGE 4

DISTRIBUTED CONVOLUTION FOR NEURAL NETWORKS

FIELD OF THE SPECIFICATION

This disclosure relates in general to the field of computer processing, and more particularly, though not exclusively, to performing matrix operations using a plurality of processing resources.

BACKGROUND

Matrix operations, such as matrix multiplication and convolutions, can be highly processor-intensive and memory-intensive operations, as they often involve complex operations on large, multi-dimensional matrix operands. Accordingly, the performance of complex matrix operations can be limited by the processing and/or memory latency. As matrix operations are increasingly utilized in a variety of applications and with ever-growing data sets (from graphics and image processing to machine learning and artificial intelligence), the demand for high-performance processing of matrix operations is increasing.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
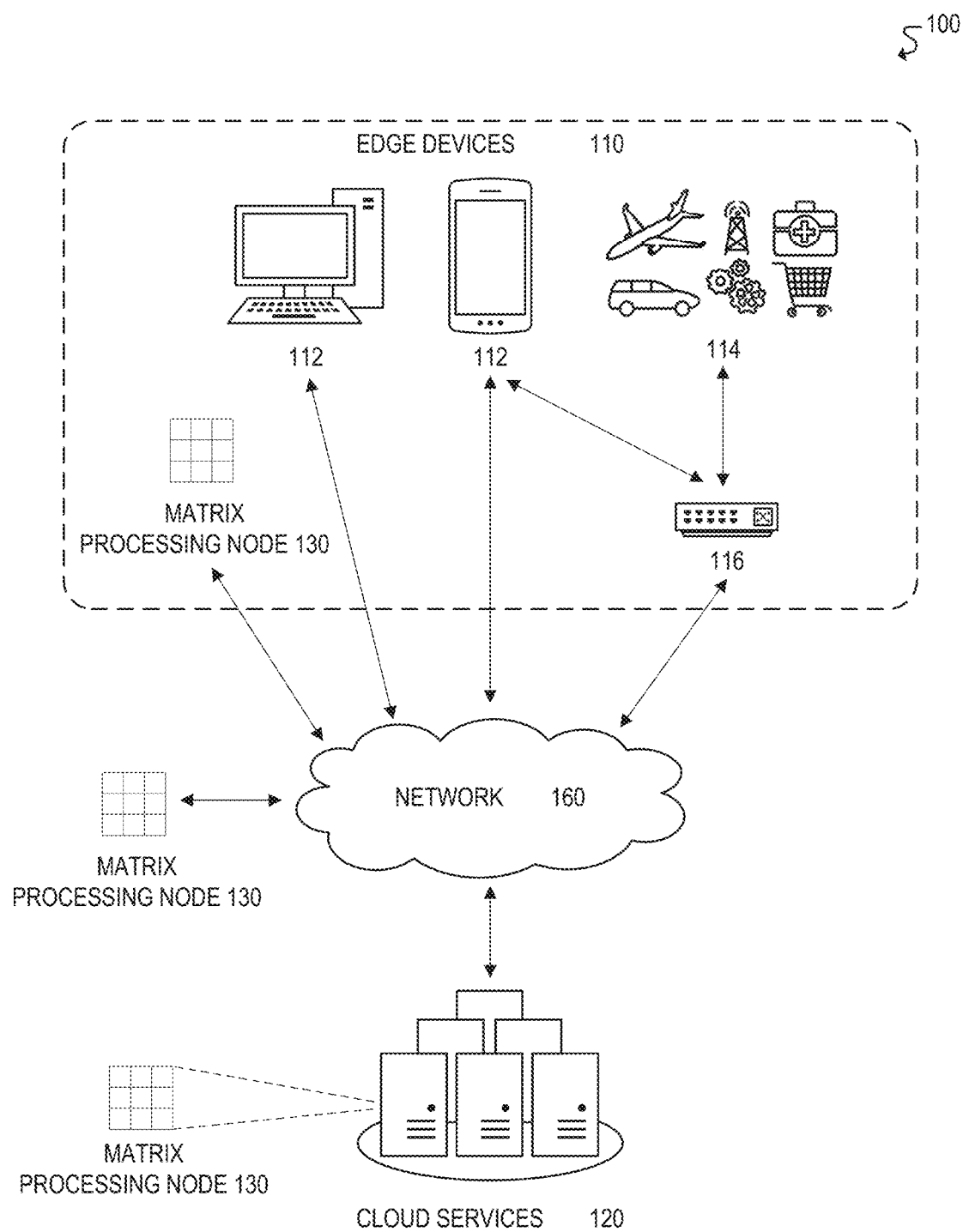
FIG. 1 illustrates a schematic diagram for an example computing system according to certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Matrix processing operations (e.g., linear algebra operations that involve matrix and/or vector operands) have a wide range of applications in computing systems, from graphics processing to machine learning and artificial intelligence, among other examples. For example, complex matrix operations may be used to implement artificial neural networks that provide artificial intelligence and machine learning capabilities, including computer vision, autonomous navigation, speech and audio recognition, and natural language processing, among other examples. These complex matrix operations (e.g., matrix multiplication and convolutions) may be used to implement the fundamental operations of neural networks, such as forward propagation, backward propagation, and weight updates. These matrix operations, however, can be highly processor and memory intensive, as they often involve complex operations on large, multi-dimensional matrix operands. Accordingly, the performance of these matrix operations can be limited by processing and/or memory latency. As matrix operations are increasingly utilized in a variety of applications with ever-growing data sets, such as artificial intelligence and machine learning, the demand for high-performance processing of matrix operations is increasing.

Existing matrix processing approaches suffer from various inefficiencies, particularly when used to implement artificial intelligence and machine learning in artificial neural networks. For example, while central processing units (CPUs) could be used to perform matrix operations, many CPU architectures are designed for low arithmetic intensity operations (i.e., a low ratio of arithmetic operations relative to memory operations), and thus are not designed for efficient execution of matrix operations. Moreover, many CPU architectures utilize complex local or cache memory management routines, which may increase processing overhead and execution complexity for operations involving large matrix operands. Graphics processing units (GPUs) could also be used to perform matrix operations. GPUs, however, are often designed for high precision computations and may provide a level of precision that is unnecessary for certain matrix operations, thus reducing the volume of matrix operations that can be performed. Accordingly, existing matrix processing approaches are inefficient for certain matrix operations, such as matrix multiplication or convolution operations involving large matrix operands and/or matrix operands with certain dimensions, among other examples. The existing approaches are unable to perform these matrix operations with 100% processing efficiency using all available processing resources. Moreover, existing approaches cannot be efficiently scaled to perform these matrix operations across additional processing resources in parallel. As an example, existing approaches are inefficient for matrix multiplication (e.g., general matrix multiplication or GEMM) on a large matrix operand which is neither square nor a single vector, such as a "thin" matrix with a much larger height than width. Existing approaches require more time to access and communicate the matrix operands than to perform the actual matrix computations, resulting in idle processing time while matrix operands are being obtained from memory and/or communicated to processing resources. Similarly, existing approaches are inefficient for convolution operations on large matrix operands, as they are unable to efficiently distribute or scale a convolution operation across a variable number of processing resources. Thus, existing approaches do not achieve 100% processing efficiency for these matrix operations.

The matrix processing functionality described throughout this disclosure performs matrix operations using a distributed approach that achieves 100% processing efficiency using the available processing resources. For example, this approach distributes matrix operations across multiple processing resources in a processing architecture that is optimized for performing matrix operations, thus enabling full utilization of the processing resources throughout the duration of the matrix operations. For example, the processing architecture may include multiple processing resources that are designed and optimized for performing matrix operations, and may support a higher volume of matrix operations than other architectures (e.g., GPUs). In some embodiments, these processing resources may be configured in a cyclical arrangement, with either unidirectional communication interfaces between neighboring processing resources (a "single-cyclical" configuration) or bi-directional communication interfaces between neighboring processing resources (a "dual-cyclical" configuration). In addition, the processing resources may be arranged hierarchically with multiple levels of processing resources. For example, in some embodiments, the processing resources may include multiple matrix processing chips, multiple high bandwidth memory (HBM) modules and matrix processing clusters on each matrix processing chip, and/or multiple matrix processing units (MPUs) on each matrix processing cluster. This processing architecture enables matrix operations to be distributed across multiple processing resources and/or processing hierarchies with 100% processing efficiency. In addition, this processing architecture enables matrix operations to be efficiently scaled across a variable number of processing resources operating in parallel, while still achieving 100% processing efficiency.

The distributed matrix processing functionality described throughout this disclosure provides numerous technical advantages, including alleviating the inefficiencies of existing approaches and enabling matrix operations to be executed efficiently, achieving 100% processing efficiency using the available processing resources, and efficiently scaling matrix operations across a variable number of processing resources operating in parallel. These advantages result in reduced processing time for matrix operations, which improves performance for applications that involve complex matrix operations, such as artificial intelligence and machine learning functionality implemented using artificial neural networks (e.g., convolutional neural networks, multilayer perceptrons (MLPs), restricted Boltzmann machines (RBM), and deep belief networks (DBN), among other examples).

Example embodiments that may be used to implement the matrix processing functionality of this disclosure will now be described with more particular reference to the attached FIGURES.

FIG. 1 illustrates a schematic diagram for an example computing system 100 according to certain embodiments.

In some embodiments, the matrix processing functionality described throughout this disclosure may be implemented in system 100. Matrix processing functionality may be used in system 100 for a wide range of applications and/or use cases involving matrix operations, from graphics processing to machine learning and artificial intelligence, among other examples. For example, in some embodiments, matrix processing functionality may be used to implement artificial intelligence and machine learning in artificial neural networks. Moreover, matrix processing functionality may be implemented by any component of system 100. For example, in the illustrated embodiment, system 100 includes edge devices 110, cloud services 120, matrix processing nodes 130, and network 150. Matrix processing nodes 130 may include any component or device with matrix processing functionality, including any component of system 100. For example, matrix processing nodes 130 may include cloud services 120 and/or servers implemented with matrix processing functionality (e.g., application servers in a datacenter), edge devices 110 implemented with matrix processing functionality (e.g., end-user devices 112, Internet-of-Things devices 114, gateways 116), and so forth. These various components of system 100 are discussed further below.

Edge devices 110 may include any equipment and/or devices deployed or connected near the "edge" of a communication system 100. Edge devices 110 may communicate with each other and/or with other remote networks and services (e.g., cloud services 120) through one or more networks and/or communication protocols, such as network 150. In some embodiments, certain edge devices 110 may include the matrix processing functionality described throughout this disclosure, and thus may be used as matrix processing nodes 130. In the illustrated embodiment, edge devices 110 include end-user devices 112 (e.g., desktops, laptops, mobile devices), Internet-of-Things (IoT) devices 114, and gateways and/or routers 116, among other examples.

End-user devices 112 may include any device that enables or facilitates user interaction with computing system 100, including, for example, desktop computers, laptops, tablets, mobile phones and other mobile devices, and wearable devices (e.g., smart watches, smart glasses, headsets), among other examples.

IoT devices 114 may include any device capable of communicating and/or participating in an Internet-of-Things (IoT) system or network. IoT systems may refer to new or improved ad-hoc systems and networks composed of multiple different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of system 100, such as with cloud services 120 and/or other edge devices 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of system 100.

IoT devices 114 may include various types of sensors for monitoring, detecting, measuring, and generating sensor data and signals associated with characteristics of their environment. For instance, a given sensor may be configured to detect one or more respective characteristics, such as movement, weight, physical contact, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/actuators. IoT devices 114 may include, for example, any type of equipment and/or devices associated with any type of system 100 and/or industry, including transportation (e.g., automobile, airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, IoT devices 114 may include equipment and devices associated with aircrafts, automobiles, or vessels, such as navigation systems, autonomous flight or driving systems, traffic sensors and controllers, and/or any internal mechanical or electrical components that are monitored by sensors (e.g., engines). IoT devices 114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 114 can be statically located, such as mounted on a building, wall, floor, ground, lamppost, sign, water tower, or any other fixed or static structure. IoT devices 114 can also be mobile, such as devices in vehicles or aircrafts, drones, packages (e.g., for tracking cargo), mobile devices, and wearable devices, among other examples. Moreover, an IoT device 114 can also be any type of edge device 110, including end-user devices 112 and edge gateways and routers 116.

Edge gateways and/or routers 116 may be used to facilitate communication to and from edge devices 110. For example, gateways 116 may provide communication capabilities to existing legacy devices that were initially developed without any such capabilities (e.g., "brownfield" IoT devices). Gateways 116 can also be utilized to extend the geographical reach of edge devices 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or cloud services 120 using another wired or wireless communication medium (e.g., Ethernet, Wi-Fi, cellular). In some embodiments, a gateway 116 may be implemented by a dedicated gateway device, or by a general purpose device, such as another IoT device 114, end-user device 112, or other type of edge device 110.

In some instances, gateways 116 may also implement certain network management and/or application functionality (e.g., IoT management and/or IoT application functionality for IoT devices 114), either separately or in conjunction with other components, such as cloud services 120 and/or other edge devices 110. For example, in some embodiments, configuration parameters and/or application logic may be pushed or pulled to or from a gateway device 116, allowing IoT devices 114 (or other edge devices 110) within range or proximity of the gateway 116 to be configured for a particular IoT application or use case.

Cloud services 120 may include services that are hosted remotely over a network 150, or in the "cloud." In some embodiments, for example, cloud services 120 may be remotely hosted on servers in datacenter (e.g., application servers or database servers). Cloud services 120 may include any services that can be utilized by or for edge devices 110, including but not limited to, data storage, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. In some embodiments, certain cloud services 120 may include the matrix processing functionality described throughout this disclosure, and thus may be used as matrix processing nodes 130.

In general, edge devices 110 (and in particular IoT devices 114) may generate an extremely large volume and variety of data. IoT edge devices 114 typically offload this data to the cloud for processing and/or storage (e.g., by cloud services 120). Cloud services 120, however, may not necessarily be suited to handle the rapidly growing volume, variety, and velocity of data generated by IoT devices 114 and other edge devices 110. For example, cloud-based processing may not be ideal in certain circumstances, such as processing time-sensitive or highly confidential data, or when faced with network bandwidth constraints, among other examples. In some embodiments, cloud services 120 may leverage "edge" based processing using edge devices 110 to improve the performance of cloud services. Edge processing is an approach that involves processing certain data at the network edge (e.g., using edge devices 110), near where the data is generated, rather than simply funneling large volumes of data to the cloud for processing and storage. Certain data may still be sent to the cloud, as appropriate, such as for deeper analysis and/or long-term storage. Edge processing may be used to complement the shortcomings of cloud-based processing (e.g., when cloud-based processing is inefficient, ineffective, and/or unsecure), and thus improve the handling of the growing volume, variety, and velocity of data generated by IoT devices 114 and/or other edge devices 110. For example, in some cases, processing data near its source (e.g., in the network edge) rather than in the cloud may improve performance and/or avoid system failures or disasters. Edge processing may also conserve network bandwidth, which may be particularly beneficial when facing bandwidth constraints and/or limited network connectivity.

In some embodiments, edge devices 110 that provide edge-based processing for cloud services 120 may be collectively referred to as the "fog," as they serve to extend the "cloud" to the edge of the network, thus creating a "fog" over the network edge. In some embodiments, devices 110 in the "fog" may connect and/or communicate with each other, for example, using an interconnection standard or protocol. For example, in some embodiments, device interconnection may be implemented using the open interconnect consortium (OIC) standard specification 1.0, released by the Open Connectivity Foundation™ (OCF) on Dec. 23, 2015, which enables devices to discover and connect with each other. Another interconnection protocol that may be used is Thread, a networking protocol for Internet-of-Things (IoT) devices used in "smart" home automation and similar deployments, which has been developed by an alliance of organizations named the "Thread Group." Other interconnection protocols may also be used, including, for example, the optimized link state routing (OLSR) protocol, or the better approach to mobile ad-hoc networking (B.A.T-.M.A.N.), among others.

Network 150 may be used to facilitate communication between the components of computing system 100. For example, edge devices 110, such as end-user devices 112 and IoT devices 114, may use network 150 to communicate with each other and/or access one or more remote cloud services 120. Network 150 may include any number or type of communication networks, including, for example, local area networks, wide area networks, public networks, the Internet, cellular networks, Wi-Fi networks, short-range networks (e.g., Bluetooth or ZigBee), and/or any other wired or wireless networks or communication mediums.

Any, all, or some of the computing devices of system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Example Matrix Processing Architecture

Figure 2A:
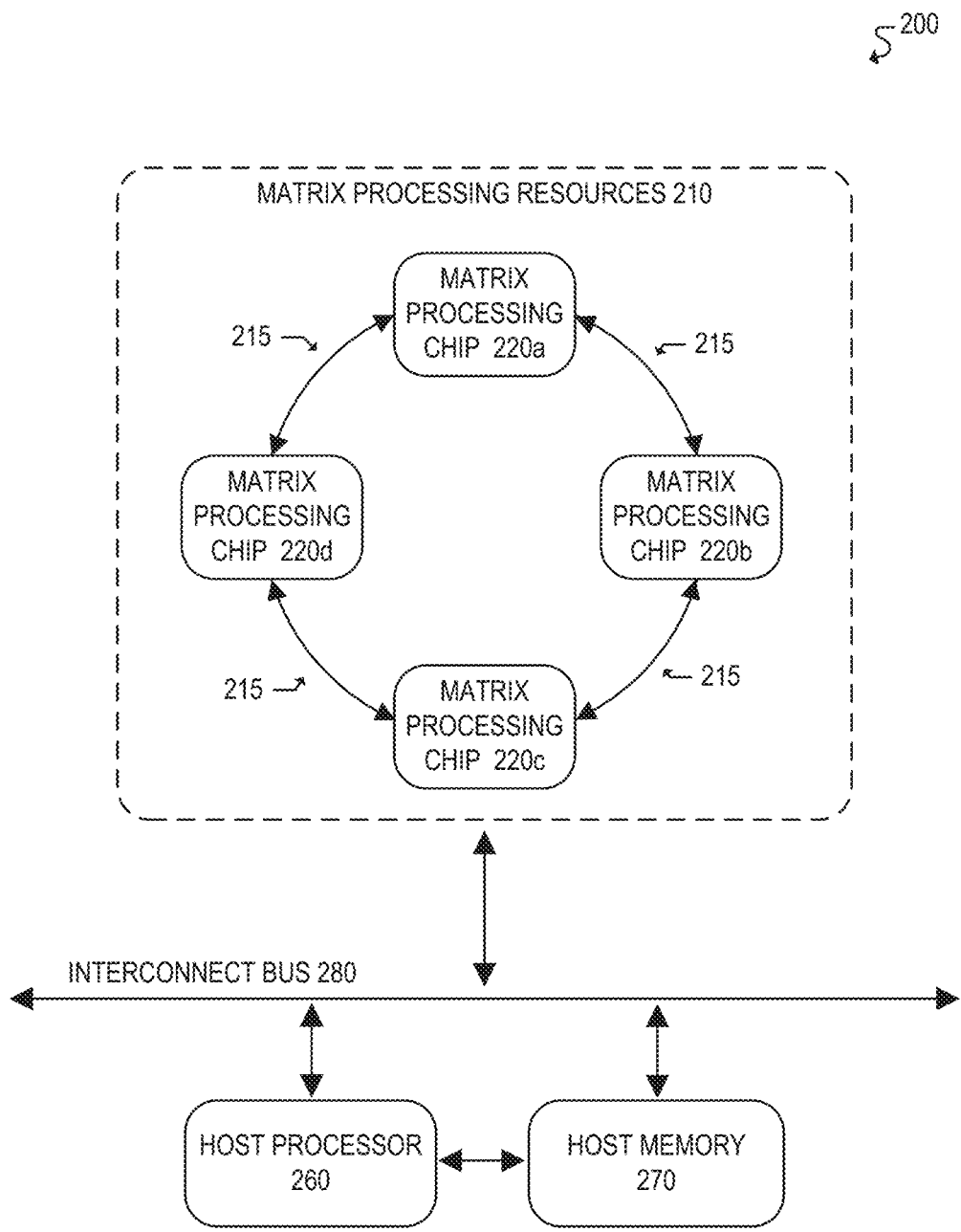
FIGS. 2A-C illustrate block diagrams for an example embodiment of a matrix processing architecture.
Figure 2B:
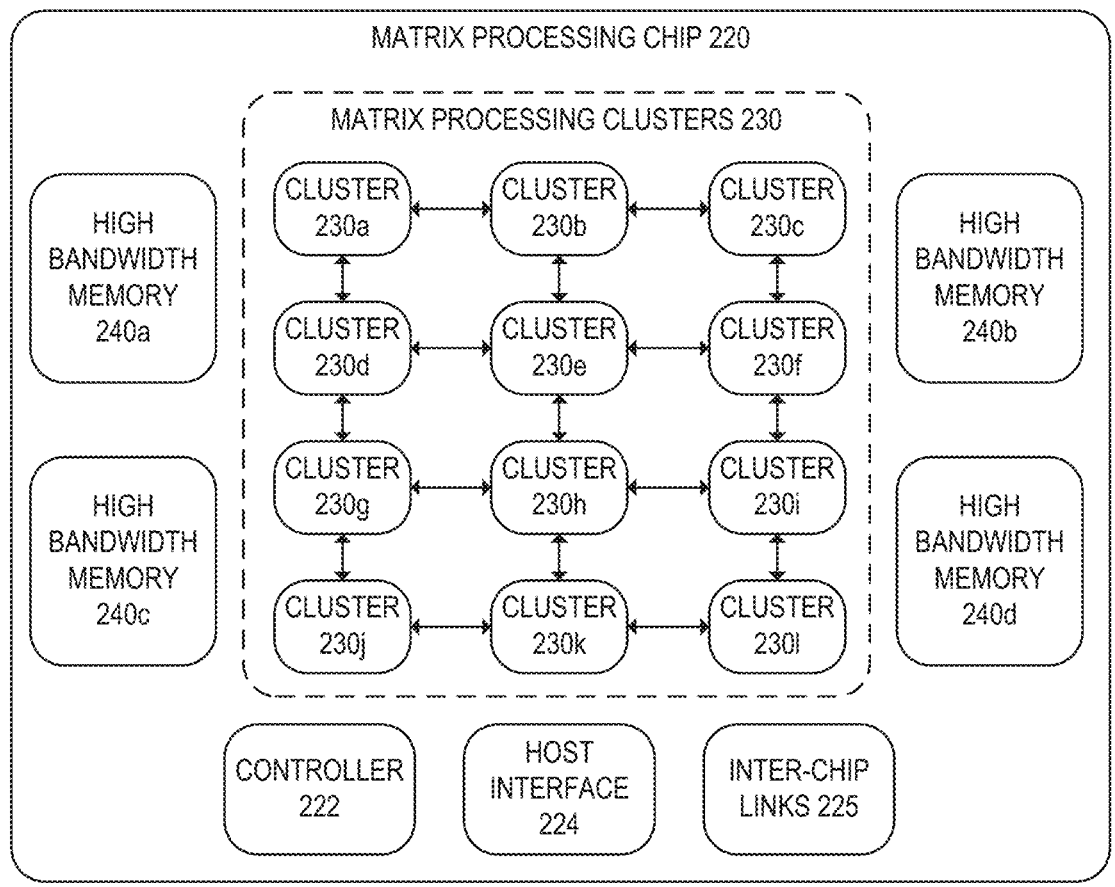
Figure 2C:
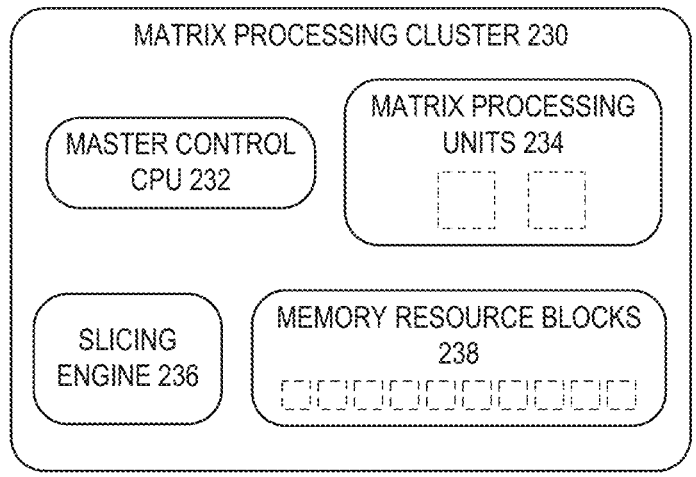

FIGS. 2A-C illustrate block diagrams for an example embodiment of a matrix processing architecture.

In some embodiments, the matrix processing functionality described throughout this disclosure may be implemented using a matrix processing architecture, such as the matrix processing architecture of FIGS. 2A-2C. Matrix processing architectures, such as the matrix processing architecture of FIGS. 2A-2C, may be implemented or used in a variety of systems, devices, and/or components, such as those described throughout this disclosure, including system 100 of FIG. 1 and/or any of its associated components (e.g., cloud services 120/datacenter servers, edge devices 110, matrix processing nodes 130). In some embodiments, the matrix processing architecture of FIGS. 2A-2C may be used to implement artificial intelligence and machine learning in neural networks. The matrix processing architecture illustrated in FIGS. 2A-2C is merely one example embodiment for performing the matrix processing functionality described throughout this disclosure. Other embodiments may use different types, arrangements, and/or numbers of components. For example, other embodiments may include any number of matrix processing chips 220, matrix processing clusters 230, matrix processing units (MPUs) 234, high bandwidth memory (HBM) modules 240, and/or memory resource blocks (MRBs) 238. Moreover, all or part of any component of the matrix processing architecture of FIGS. 2A-2C (e.g., any component of matrix processing system 200, matrix processing chips 220, and/or matrix processing clusters 230) may be implemented as a separate or stand-alone component or chip, or may be integrated with other components or chips, such as a system-on-a-chip (SoC) that integrates various computer components into a single chip.

FIG. 2A illustrates a block diagram for an example embodiment of a matrix processing system 200. In the illustrated embodiment, matrix processing system 200 includes host processor 260, host memory 270, matrix processing resources 210, and interconnect bus 280.

Host processor 260 may be configured to control and/or manage matrix processing system 200. For example, in some embodiments, host processor 260 may use matrix processing resources 210 to perform complex matrix operations. Host processor 260 may be any processing resource capable of controlling and/or managing matrix processing functionality of matrix processing system 200. For example, in some embodiments, host processor 260 may be implemented using computer processors 300 or 400 of FIGS. 3 and 4, respectively. In some embodiments, host processor 260 may be a separate or stand-alone component that is communicatively coupled to matrix processing resources 210. Alternatively, in other embodiments, host processor 260 and matrix processing resources 210 may be integrated into the same component or chip. For example, in some embodiments, the components of matrix processing system 200, including host processor 260 and matrix processing resources 210, may be implemented as a system-on-a-chip (SoC).

Host memory 270 may include any type or combination of volatile and/or non-volatile memory. Examples of volatile memory include various types of random access memory (RAM), such as dynamic random access memory (DRAM), synchronous dynamic random access memory (SDRAM), and static random access memory (SRAM), among other examples. Examples of non-volatile memory include disk-based storage mediums (e.g., magnetic and/or optical storage mediums), solid-state storage (e.g., any form of persistent flash memory, including planar or three dimensional (3D) NAND flash memory or NOR flash memory), 3D crosspoint memory, electrically erasable programmable read-only memory (EEPROM), and/or other types of non-volatile random access memories (RAM), among other examples. Host memory 270 may be used, for example, to store information for host processor 260 during execution, such as code and/or data.

Interconnect bus 280 may be used, in some embodiments, to communicatively couple host processor 260 and host memory 270 to matrix processing resources 210. Interconnect bus 280 may use any interconnection protocol, such as Peripheral Component Interconnect express (PCIe), Universal Serial Bus (USB), or Small Computer Systems Interface (SCSI), among other examples.

Matrix processing resources 210 may include any processing resources configured to perform matrix operations. For example, matrix processing resources 210 may be configured to perform matrix multiplication operations, convolution operations, element-wise matrix operations (e.g., +, *, /, <, >, =), dimension shuffle operations, and/or any combination thereof. In some embodiments, matrix processing resources 210 may include processing resources that are designed and optimized for performing matrix operations. In some embodiments, matrix processing resources 210 may also be arranged hierarchically with multiple levels of processing resources. For example, in the illustrated embodiment, matrix processing resources 210 include a plurality of matrix processing chips 220, and may also include any processing resources within each matrix processing chip 220. For example, as discussed below in connection with FIGS. 2B and 2C, each matrix processing chip 220 may include a plurality of high bandwidth memory (HBM) modules 240 and a plurality of matrix processing clusters 230, and each matrix processing cluster 230 may include multiple matrix processing units 234. Thus, in some embodiments, matrix processing resources 210 may include multiple matrix processing chips 220, multiple high bandwidth memory (HBM) modules 240 and multiple matrix processing clusters 230 on each matrix processing chip 220, and/or multiple matrix processing units 234 on each matrix processing cluster 230.

Matrix processing chips 220 may be, for example, any chips or other components configured to perform matrix operations. For example, in some embodiments, a matrix processing chip 220 may be a peripheral card or chip connected to host processor 260 using any type of interconnect interface, such as a PCIe interface. In some embodiments, a matrix processing chip 220 may be implemented using an integrated circuit, such as an application specific integrated circuit (ASIC), a field programmable gate array (FPGA), and/or any other type of circuitry. In the illustrated embodiment, matrix processing chips 220 are configured in a cyclical arrangement, with communication channels 215 between neighboring matrix processing chips 220. In some embodiments, communication channels 215 may provide one-way communication between neighboring matrix processing chips 220. In other embodiments, however, communication channels 215 may provide bi-directional communication between neighboring matrix processing chips 220. A cyclical arrangement with one-way communication between neighboring processing resources may be referred to as a "single-cyclical" configuration, while a cyclical arrangement with bi-directional communication between neighboring processing resources may be referred to as a "dual-cyclical" configuration.

Moreover, although not illustrated, in some embodiments matrix processing system 200 may include a communication interface to communicate over a communication network. For example, in some embodiments, matrix processing system 200 may communicate over a network with one or more remote matrix processing chips to perform distributed matrix operations.

FIG. 2B illustrates a block diagram for an example embodiment of a matrix processing chip 220. In the illustrated embodiment, matrix processing chip 220 includes controller 222, host interface 224, inter-chip links 225, high bandwidth memory (HBM) modules 240, and matrix processing clusters 230.

Controller 222 may be configured to control and/or manage matrix operations performed by matrix processing chip 220. In some embodiments, controller 222 may control and/or manage matrix operations in conjunction with host processor 260 of FIG. 2A and/or master control CPUs (MCCs) 232 of matrix processing clusters 230 of FIG. 2C. For example, in some embodiments, host processor 260, controller 222, and/or master control CPUs (MCCs) 232 may be configured to receive a matrix operation or command, and distribute the matrix operation and matrix operands across matrix processing clusters 230 and high bandwidth memory (HBM) modules 240. In some embodiments, controller 222 may be a microprocessor, an integrated circuit, and/or any other type of circuitry and/or processing logic.

Host interface 224 may be a communication interface that enables a matrix processing chip 220 to communicate with host processor 260 of FIG. 2A. In some embodiments, for example, controller 222 may use host interface 224 to communicate with host processor 260 of FIG. 2A. Host interface 224 may use any type of interconnect protocol or interface, including Peripheral Component Interconnect express (PCIe), Universal Serial Bus (USB), or Small Computer Systems Interface (SCSI), among other examples.

Inter-chip links (ICLs) 225 may enable a matrix processing chip 220 to communicate with other matrix processing chips. For example, inter-chip links 225 may be used to implement the communication channels 215 between matrix processing chips 220 in FIG. 2A. An inter-chip link 225 may be, for example, any communication interface that enables a matrix processing chip 220 to communicate with another matrix processing chip. In some embodiments, a matrix processing chip 220 may include multiple inter-chip links 225 (e.g., twelve inter-chip links). In some embodiments, an inter-chip link 225 may be implemented using one or more serializer/de-serializer (SerDes) interfaces. A SerDes interface may be a communication interface that converts data from serial to parallel, and vice-versa. For example, the transmitter of a SerDes interface may include a serial-to-parallel converter, and the receiver of a SerDes interface may include a parallel-to-serial converter. In some embodiments, a matrix processing chip 220 may use multiple SerDes interfaces for each connection to another matrix processing chip (e.g., four SerDes interfaces between each pair of connected matrix processing chips).

High bandwidth memory (HBM) modules 240 may be memory components associated with matrix processing chip 220 that are used to store matrix operands and other matrix data. In some embodiments, high bandwidth memory (HBM) modules 240 may be designed to efficiently store and retrieve matrix data. In some embodiments, high bandwidth memory (HBM) modules 240 may be multi-dimensional memory components configured to store and retrieve data in multiple dimensions. For example, in some embodiments, high bandwidth memory (HBM) modules 240 may be memory components configured to store and retrieve data in two dimensions, such as rows and columns. Other embodiments, however, may use memory components configured to store and retrieve data using any other number of dimensions (e.g., one dimension, three dimensions, four dimensions, and so forth). In the illustrated embodiment, matrix processing chip 220 includes four high bandwidth memory (HBM) modules 240a-d. In some embodiments, high bandwidth memory (HBM) modules 240 may be shared by the matrix processing clusters 230 of a matrix processing chip 220.

Matrix processing clusters 230 may include processing resources configured to perform matrix operations, such as matrix multiplication, convolutions, and/or dimension shuffling, among other examples. In some embodiments, matrix processing clusters 230 may be collectively used to execute a particular matrix operation by performing matrix processing in parallel. In the illustrated embodiment, matrix processing chip 220 includes twelve matrix processing clusters 230a-l. Moreover, in the illustrated embodiment, matrix processing clusters 230 are configured or arranged using a two-dimensional mesh interconnection topology. The interconnection topology of matrix processing clusters 230 may facilitate cyclical communication among the matrix processing clusters 230. Moreover, other embodiments may include any number and/or arrangement of matrix processing clusters 230.

FIG. 2C illustrates a block diagram for an example embodiment of a matrix processing cluster 230. In the illustrated embodiment, matrix processing cluster 230 includes master control CPU (MCC) 232, matrix processing units (MPUs) 234, slicing engine 236, and memory resource blocks (MRBs) 238.

Master control CPU (MCC) 232 may be configured to control and/or manage matrix operations performed by a matrix processing cluster 230. In some embodiments, master control CPU 232 may be a microprocessor, an integrated circuit, and/or any other type of circuitry and/or processing logic. In some embodiments, master control CPU 232 may receive instructions from another component, such as host processor 260 of FIG. 2A and/or controller 222 of FIG. 2B. Based on the instructions, master control CPU 232 may then use matrix processing units 234 to perform matrix operations, such as matrix multiplication, convolutions, and/or dimension shuffling, among other examples. For example, master control CPU 232 may receive an instruction to perform a matrix multiplication operation, such as C=A*B. The instruction may include the handles or identifiers for each matrix, and may also indicate how the matrices should be stored in memory resource blocks (MRBs) 238. Matrices A and B may then be broken down into a series of smaller matrices (e.g., 32×32 matrices). Matrix operations may then be performed on the smaller matrices, and the partial results may be stored in memory resource blocks (MRBs) 238, until the output matrix C has been fully computed.

Matrix processing units (MPUs) 234 may be configured to perform matrix operations, such as matrix multiplication, convolutions, and/or dimension shuffling. In some embodiments, matrix processing units (MPUs) 234 perform matrix operations based on commands received from master control CPU (MCC) 232. Moreover, in some embodiments, each matrix processing cluster 230 may include multiple matrix processing units (MPUs) 234. For example, in the illustrated embodiment, matrix processing cluster 230 includes two matrix processing units (MPUs) 234. A matrix processing unit (MPU) 234 may be capable of performing matrix operations, such as matrix multiplication, on small matrices (e.g., 32×32 matrices). In some cases, a matrix processing unit (MPU) 234 may be designed and/or optimized to perform matrix multiplication operations. A matrix processing unit (MPU) 234 may load matrix operands from memory resource blocks (MRBs) 238. In some embodiments, a matrix processing unit (MPU) 234 may support the following arithmetic operations: matrix multiplication; unary matrix operations; binary matrix operations, such as addition (+), subtraction (−), multiplication (*), division (/), bitwise XOR, AND, OR, logical and arithmetic left and right shift, comparison (>, <, >=, <=, ==, !=); and column-wise, row-wise, and matrix-wide operations, such as sum, max value, and min value.

Slicing engine 236 may be configured to slice the matrix operands of a particular matrix operation into smaller partial matrices. For example, in some embodiments, master control CPU (MCC) 232 may use slicing engine 236 to break up matrix operands into smaller partial matrices for matrix processing units (MPUs) 234. In some embodiments, slicing engine 236 may include a convolution slicing engine (CSE) to perform matrix slicing for convolution operations. For example, in some embodiments, a convolution slicing engine (CSE) may slice matrix operands in a manner that enables a convolution operation to be cast as a matrix multiplication operation, thus enabling the same processing logic to perform both matrix multiplication and convolution operations. Moreover, in some embodiments, slicing engine 236 and/or the associated convolution slicing engine (CSE) may be used to perform the dimension shuffle operations to reorder the dimensions of a matrix.

Memory resource blocks (MRBs) 238 may be memory components on matrix processing cluster 230 used to store matrix operands and other matrix data. In some embodiments, memory resource blocks (MRBs) 238 may be designed to store and retrieve matrix data efficiently. In some embodiments, memory resource blocks (MRBs) 238 may be multi-dimensional memory components configured to store and retrieve data in multiple dimensions. For example, in some embodiments, memory resource blocks (MRBs) 238 may be memory components configured to store and retrieve data in two dimensions, such as rows and columns. In the illustrated embodiment, matrix processing cluster 230 includes ten memory resource blocks (MRBs) 238. Other embodiments, however, may include a different number of memory resource blocks (MRBs) 238 on a matrix processing cluster 230. In some embodiments, each memory resource block (MRB) 238 may be capable of storing a matrix of a certain size (e.g., a 256×512 matrix). In some embodiments, memory resource blocks (MRBs) 238 may be shared by the matrix processing units (MPUs) 234 of a particular matrix processing cluster 230.

In some embodiments, the matrix processing architecture of FIGS. 2A-2C may be used to implement the matrix processing functionality described throughout this disclosure. For example, matrix processing system 200 may be used to perform matrix operations using a distributed approach that achieves 100% processing efficiency using the available processing resources. For example, in some embodiments, a matrix operation may be distributed across multiple processing resources 210 that are optimized for matrix processing, thus enabling full utilization of the processing resources 210 throughout the duration of the matrix operation. For example, matrix processing system 200 may include multiple processing resources 210 that are designed and optimized for performing matrix operations. In some embodiments, these processing resources 210 may be configured in a single-cyclical or dual-cyclical arrangement. In addition, the processing resources 210 may be arranged hierarchically with multiple levels of processing resources. For example, in some embodiments, the processing resources 210 may include multiple matrix processing chips 220, multiple high bandwidth memory (HBM) modules 240 and multiple matrix processing clusters 230 on each matrix processing chip 220, and/or multiple matrix processing units (MPUs) 234 on each matrix processing cluster 230. This processing architecture enables matrix operations to be distributed across multiple processing resources 210 and/or processing hierarchies with 100% processing efficiency. In addition, this processing architecture enables matrix operations to be efficiently scaled across a variable number of processing resources 210 operating in parallel, while still achieving 100% processing efficiency. For example, scaling may be achieved by adjusting the number of processing resources 210 used to perform a particular matrix operation, such as the number of matrix processing systems 200 or servers, the number of matrix processing chips 220 in each matrix processing system 200 or server, and so forth.

As an example, the matrix processing architecture of FIGS. 2A-2C may be used to implement matrix multiplication and/or convolution operations. For example, in some embodiments, a matrix multiplication operation may be distributed across multiple processing resources 210 in a manner that results in the latency for communicating matrix operands being less than the matrix processing time, which allows the communication of matrix operands to be completed while the matrix processing is being performed. For example, for certain matrix operations involving matrix operands with certain dimensions (e.g., matrix multiplication with a "thin" matrix operand), the time required to access and communicate matrix operands may exceed the time required to perform the actual matrix computations, resulting in idle processing time while the matrix operands are being obtained from memory and/or communicated to processing resources 210. For example, a single-cyclical configuration (e.g., where each processing resource 210 only obtains matrix operands and data from one neighboring processing resource 210 at any given time) may be unable to achieve 100% processing efficiency for these particular types of matrix operations and matrix operands. However, a dual-cyclical configuration of processing resources 210 enables each processing resource to perform matrix computations while simultaneously obtaining matrix operands and data from both of its neighboring processing resources 210, which significantly reduces the latency for communicating matrix operands, and thus avoids any idle processing time. For example, the communication latency for certain operations may be reduced by half when using a dual-cyclical approach as opposed to a single-cyclical approach. In this manner, the latency for communicating matrix operands and matrix data can be fully masked by the matrix processing time, thus avoiding any wasted or idle processing time and achieving 100% processing efficiency. Accordingly, matrix operations (e.g., matrix multiplication or GEMM) can be performed efficiently even for large matrix operands and/or matrix operands with certain dimensions, such as a large matrix operand that is neither square nor a single vector (e.g., a "thin" matrix with a much larger height than width). For example, matrix multiplication can be performed efficiently even when multiplying two thin matrices, a thin matrix and a square matrix, and so forth. Similarly, convolution operations may be distributed across multiple processing resources 210 in a manner that results in 100% processing efficiency using the available processing resources.

As an example, when a matrix operation or command is received, the matrix operation may be distributed across the processing resources 210 of matrix processing system 200. For example, the matrix operands (or input matrices) may be partitioned based on the number of available processing resources 210. Moreover, in some embodiments, the partitions may be across the rows of the matrix operands, and/or across any other dimension of the matrix operands. Each partition may then be distributed to a particular processing resource 210. Each processing resource 210 may then perform a plurality of partial matrix operations. In some embodiments, the plurality of partial matrix operations is performed in a plurality of stages. For example, each processing resource 210 may perform a particular stage of partial matrix operations while simultaneously sending and receiving partial matrix data to and from its neighboring processing resources 210. For example, in a single-cyclical configuration of processing resources 210, each processing resource 210 either sends or receives partial matrix data to or from each neighbor processing resource. Similarly, in a dual-cyclical configuration of processing resources 210, each processing resource 210 may send and receive partial matrix data to and from each neighboring processing resource 210.

Each processing resource 210 may then use the partial matrix data for subsequent partial matrix operations. The result of the matrix operation may then be determined based on the partial matrix operations collectively performed by the processing resources 210.

Moreover, if the processing resources 210 are arranged hierarchically, the matrix operation may be distributed in a hierarchical manner. For example, the matrix operands (or input matrices) may initially be partitioned based on the number of available matrix processing chips 220. Each partition, and the associated partial matrix operations, may then be distributed to a particular matrix processing chip 220. The partition and partial matrix operations distributed to a particular matrix processing chip 220 may then be similarly partitioned and distributed across the matrix processing clusters 230 and/or high bandwidth memory (HBM) modules 240 of the particular matrix processing chip 220. For example, for certain matrix operations, partial matrix operations may be distributed to each matrix processing cluster 230. Alternatively, for certain matrix operations, partial matrix operations may be distributed across various "logical processing nodes" (e.g., groups of matrix processing clusters 230 associated with a high-bandwidth memory (HBM) module 240), and may then be distributed to each matrix processing cluster 230 of a particular logical processing node. In some embodiments, the matrix processing clusters 230 (and/or the logical processing nodes) may be cyclically configured similar to the matrix processing chips 220. The partition and partial matrix operations distributed to a particular matrix processing cluster 230 may then be similarly partitioned and distributed across the matrix processing units (MPUs) 234 of the particular matrix processing cluster 230.

Example Computer Processor Architectures

Figure 3:
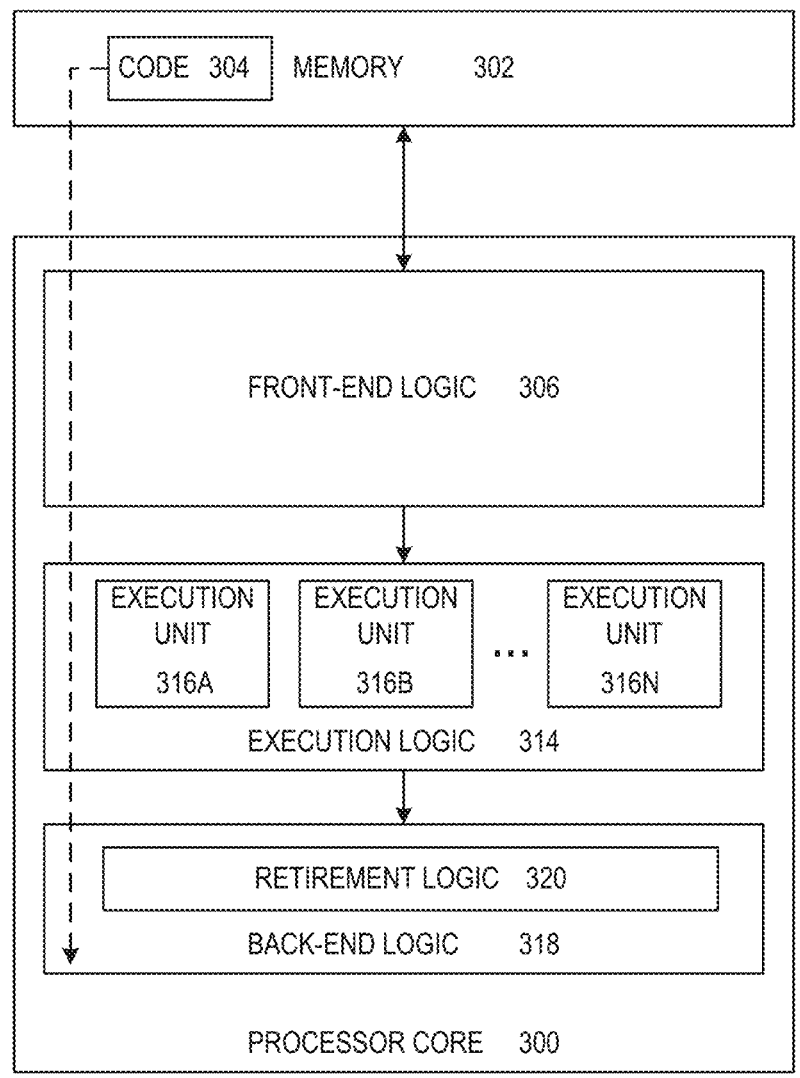
FIGS. 3 and 4 illustrate block diagrams for example embodiments of computer processors.
Figure 4:
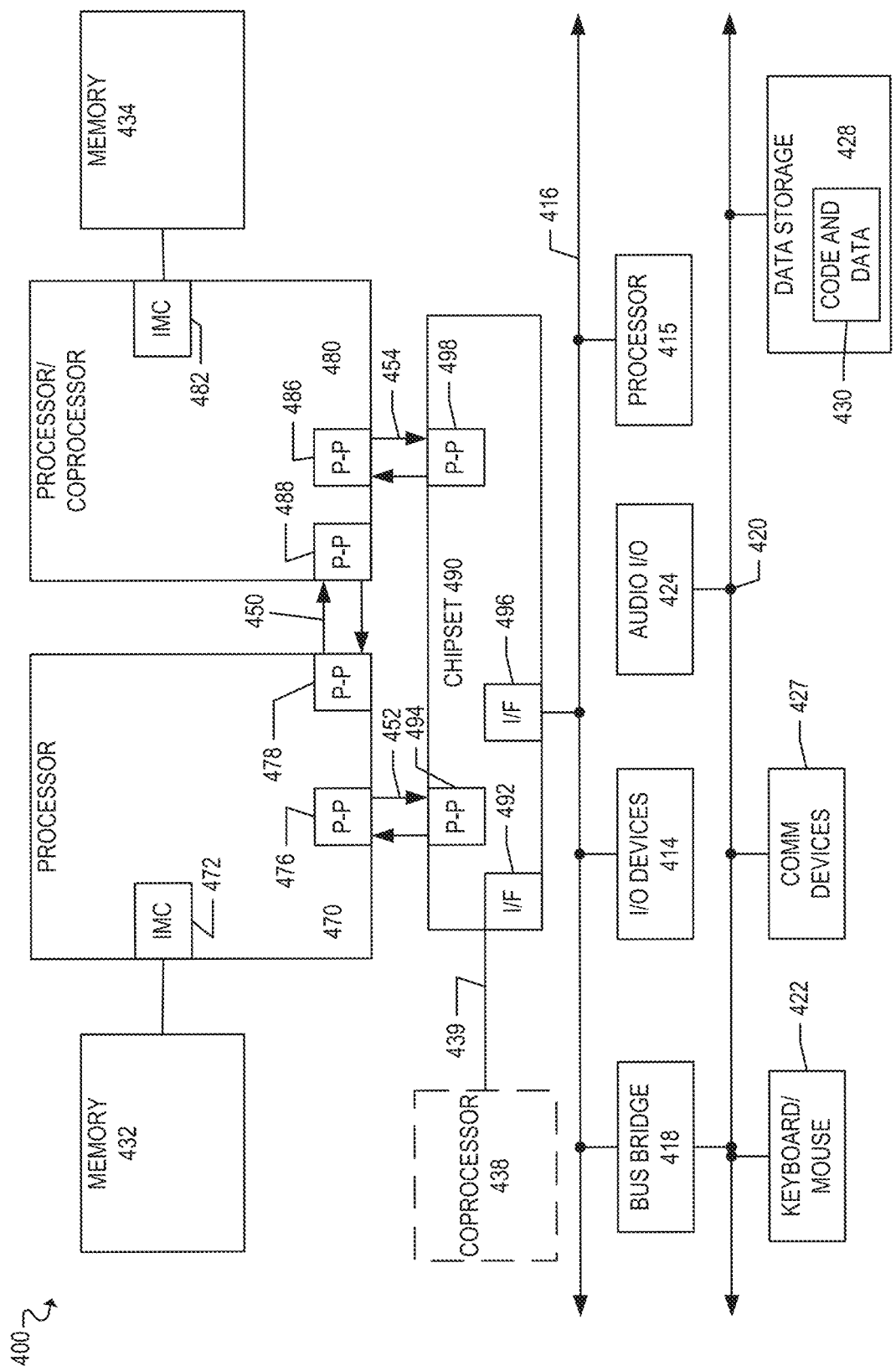

FIGS. 3 and 4 illustrate block diagrams for example embodiments of computer processors that may be used in accordance with embodiments disclosed herein. For example, the computer processors illustrated in FIGS. 3 and 4 may be used as host processors associated with matrix processing systems (e.g., host processor 260 in matrix processing system 200 of FIG. 2A), or as processors associated with other components and/or devices discussed throughout this disclosure (e.g., processors associated with components in system 100 of FIG. 1). Other processor and system designs and configurations known in the art for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 3 illustrates a block diagram for an example embodiment of a processor 300. Processor 300 is an example of a type of hardware device that can be used in connection with the embodiments described throughout this disclosure. Processor 300 may be any type of processor, such as a microprocessor, an embedded processor, a digital signal processor (DSP), a network processor, a multi-core processor, a single core processor, or other device to execute code. Although only one processor 300 is illustrated in FIG. 3, a processing element may alternatively include more than one of processor 300 illustrated in FIG. 3. Processor 300 may be a single-threaded core or, for at least one embodiment, the processor 300 may be multi-threaded in that it may include more than one hardware thread context (or "logical processor") per core.

FIG. 3 also illustrates a memory 302 coupled to processor 300 in accordance with an embodiment. Memory 302 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 300 can execute any type of instructions associated with algorithms, processes, or operations detailed herein. Generally, processor 300 can transform an element or an article (e.g., data) from one state or thing to another state or thing.

Code 304, which may be one or more instructions to be executed by processor 300, may be stored in memory 302, or may be stored in software, hardware, firmware, or any suitable combination thereof, or in any other internal or external component, device, element, or object where appropriate and based on particular needs. In one example, processor 300 can follow a program sequence of instructions indicated by code 304. Each instruction enters a front-end logic 306 and is processed by one or more decoders 308. The decoder may generate, as its output, a micro operation such as a fixed width micro operation in a predefined format, or may generate other instructions, microinstructions, or control signals that reflect the original code instruction. Front-end logic 306 may also include register renaming logic and scheduling logic, which generally allocate resources and queue the operation corresponding to the instruction for execution.

Processor 300 can also include execution logic 314 having a set of execution units 316a, 316b, 316n, etc. Some embodiments may include a number of execution units dedicated to specific functions or sets of functions. Other embodiments may include only one execution unit or one execution unit that can perform a particular function. Execution logic 314 performs the operations specified by code instructions.

After completion of execution of the operations specified by the code instructions, back-end logic 318 can retire the instructions of code 304. In one embodiment, processor 300 allows out of order execution but requires in order retirement of instructions. Retirement logic 320 may take a variety of known forms (e.g., re-order buffers or the like). In this manner, processor 300 is transformed during execution of code 304, at least in terms of the output generated by the decoder, hardware registers and tables utilized by register renaming logic 310, and any registers (not shown) modified by execution logic 314.

Although not shown in FIG. 3, a processing element may include other elements on a chip with processor 300. For example, a processing element may include memory control logic along with processor 300. The processing element may include I/O control logic and/or may include I/O control logic integrated with memory control logic. The processing element may also include one or more caches. In some embodiments, non-volatile memory (such as flash memory or fuses) may also be included on the chip with processor 300.

FIG. 4 illustrates a block diagram for an example embodiment of a multiprocessor 400. As shown in FIG. 4, multiprocessor system 400 is a point-to-point interconnect system, and includes a first processor 470 and a second processor 480 coupled via a point-to-point interconnect 450. In some embodiments, each of processors 470 and 480 may be some version of processor 300 of FIG. 3.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of this disclosure is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

All or part of any component of FIG. 4 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Distributed Convolution Operations

Figure 5:
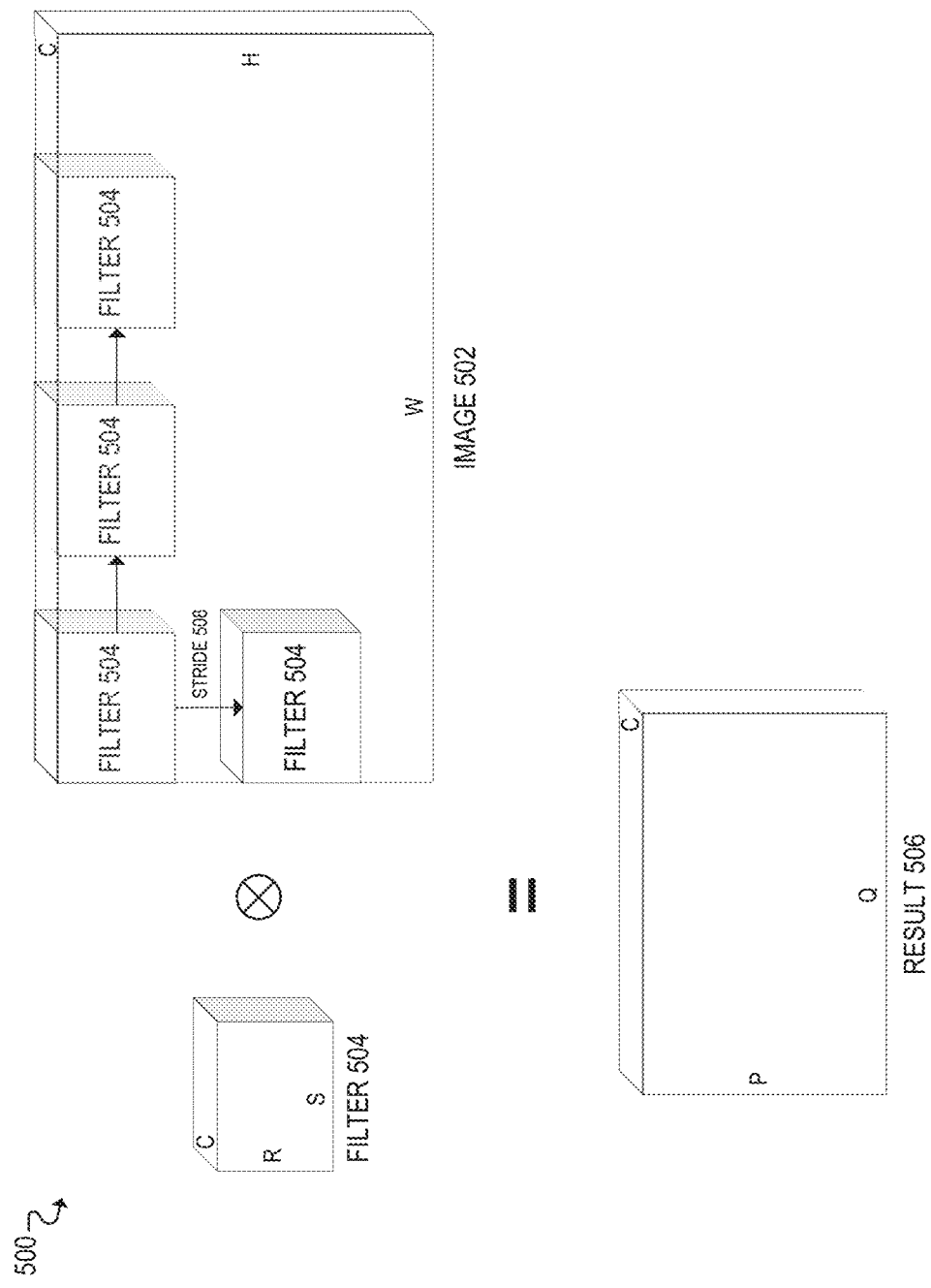
FIG. 5 illustrates an example convolution operation.

FIG. 5 illustrates an example convolution operation 500. A convolution operation may be used, for example, for image processing, such as image processing used by an artificial neural network to provide computer vision artificial intelligence and machine learning capabilities. For example, in some embodiments, convolution operations may be used to implement the fundamental operations of an artificial neural network, including forward propagation, backward propagation, and weight updates. A convolution operation used for image processing may involve applying a filter to an image. The filter (which may also be referred to as a "kernel") may be used to modify the image (e.g., applying visual effects), detect certain features in the image (e.g., facial recognition or identification of other objects), and so forth. In some embodiments, the filter may be smaller than the image, and the convolution operation may be performed by moving the filter throughout the image and applying the filter at each location.

In the illustrated embodiment, for example, a convolution operation 500 is performed on an image 502 using a filter 504, resulting in a convolution result 506. In some embodiments, the image 502, filter 504, and result 506 of a convolution operation 500 may be represented as matrices. For example, an image may be represented by a matrix whose elements correspond to each pixel of the image. For example, in some embodiments, a black and white image may be represented by a two-dimensional (2D) matrix with dimensions corresponding to the height (H) and width (W) of the image. As another example, a color image (e.g., image 502) may be represented by a three-dimensional (3D) matrix with dimensions corresponding to the number of channels (C), height (H), and width (W) of the image. The channels of the image, for example, may be used to define the color of each pixel in the image. For example, in some embodiments, a color image may include three RGB channels to define the color of each pixel (e.g., a red channel, a green channel, and a blue channel). Similarly, a filter (e.g., filter 504) for a color image may be represented by a 3D matrix with dimensions corresponding to the number of channels (C), filter height (R), and filter width (S). In these embodiments, a convolution operation 500 may be performed by moving the filter 504 throughout the image 502 and computing the dot product between the filter 504 and the various portions of the image 502. For example, in some embodiments, the filter 504 may be moved along the height and width of the image 502 using a certain stride or interval, the dot product may be computed at each location, and the result may be stored in the corresponding location of a result matrix 506. The result matrix 506, for example, may be represented by a 3D matrix with dimensions corresponding to the number of channels (C), output height (P), and output width (Q).

Moreover, in some embodiments, when convolution operations need to be performed on multiple images and using multiple filters, the images may be processed together to increase processing efficiency. Thus, in some embodiments, a collection of images may be represented using a four-dimensional (4D) matrix, with dimensions corresponding to the number of channels (C), image height (H), image width (W), and number of images (N). Similarly, a collection of filters may be represented using a 4D matrix, with dimensions corresponding to the number of filters (K), number of channels (C), filter height (R), and filter width (S). Accordingly, multiple convolution operations may then be performed using the 4D matrices that are used to represent the images and filters. The collective results of the convolution operations may be represented using a 4D matrix, with dimensions corresponding to number of filters (K), output height (P), output width (Q), and number of images (N).

FIGS. 6 and 7 illustrate example neural network operations associated with convolutions. As described above in connection with FIG. 5, a convolution operation can be used for image processing, for example, by applying a filter to an image in order to modify the image (e.g., applying visual effects), detect certain features in the image (e.g., facial recognition or identification of other objects), and so forth. Moreover, in some embodiments, convolution operations can be used for image processing in an artificial neural network, for example, to provide computer vision artificial intelligence and machine learning capabilities. For example, in some embodiments, the fundamental operations of an artificial neural network (e.g., forward propagation, backward propagation, and weight updates) can be implemented for convolution operations. These fundamental neural network operations may be used, in some embodiments, to train a neural network in order to provide machine learning functionality. For example, a forward propagation operation may include propagating a particular input through a neural network in order to generate a corresponding output. The input to the forward propagation operation may be a training pattern with a known or expected output. A backward propagation operation may then be used to determine the error associated with the forward propagation operation based on the difference or delta between the calculated output and the expected output of the forward propagation operation. A weight update operation may then be used to determine updated weight values in order to minimize the associated error. In some embodiments, these neural network operations may be implemented for convolution operations. For example, in some embodiments, these neural network operations may be implemented using the following formulas (where the asterisk (*) represents each respective operation):

forward propagation: $IFM[CHW \times N]*FILTER[CRS \times K]=OFM[KPQ \times N]$ backward propagation: $IFM[KPQ \times N]*FILTER[KRS \times C]=OFM[CHW \times N]$ weight update: $IFM1[CHW \times N]*IFM2[KPQ \times N]= OFM[CRS \times K]$ In some embodiments, the example operations illustrated by FIGS. 6 and 7 may be performed using a matrix processing architecture, such as the matrix processing architecture of FIGS. 2A-2C.

FIGS. 6A-G illustrate an example forward propagation operation in a neural network. The illustrated forward propagation operation is implemented using the following formula (where the asterisk (*) represents forward propagation): $IFM[CHW \times N]*FILTER[CRS \times K]=OFM[KPQ \times N]$. Moreover, although not illustrated, a backward propagation operation may be implemented in a manner similar to the forward propagation operation discussed throughout FIGS. 6A-G, by replacing the forward propagation formula with a formula for backward propagation, such as the following formula (where the asterisk (*) represents backward propagation): $IFM[KPQ \times N]*FILTER[KRS \times C]=OFM[CHW \times N]$.

In some embodiments, forward propagation can be implemented for convolution operations. For example, the illustrated forward propagation operation is implemented by performing convolutions using an input feature matrix (IFM) 602 and a filter 604 to generate an output feature matrix (OFM) 606. In some embodiments, IFM 602 may correspond to a collection of images represented using a four-dimensional (4D) matrix, with dimensions corresponding to the number of channels (C), image height (H), image width (W), and number of images (N). In some embodiments, however, IFM 602 may need to be stored in 2D memory (e.g., when using matrix processing architectures that store matrix operands using 2D memory components). Accordingly, because IFM 602 is a 4D matrix, its dimensions may need to be rearranged in order to store it in 2D memory. For example, in some embodiments, IFM 602 could be stored in 2D memory by treating the channels (C), height (H), and width (W) as one dimension, and treating the number of images (N) as another dimension (e.g., arranging the dimensions of IFM 602 as CHW×N).

Similarly, filter 604 may correspond to a collection of filters represented using a four-dimensional (4D) matrix, with dimensions corresponding to the number of filters (K), number of channels (C), filter height (R), and filter width (S). Moreover, because filter 604 is a 4D matrix, its dimensions may need to be rearranged in order to store it in 2D memory. For example, in some embodiments, filter 604 could be stored in 2D memory by treating the channels (C), filter height (R), and filter width (S) as one dimension, and treating the number of filters (K) as another dimension (e.g., arranging the dimensions of filter 604 as CRS×K).

OFM 606 may correspond to the result of the convolution operation, and may be represented using a four-dimensional (4D) matrix with dimensions corresponding to the number of filters (K), output height (P), output width (Q), and number of images (N). Moreover, because OFM 606 is a 4D matrix, its dimensions may need to be rearranged in order to store it in 2D memory. For example, in some embodiments, OFM 606 could be stored in 2D memory by treating the number of filters (K), output height (P), and output width (Q) as one dimension, and treating the number of images (N) as another dimension (e.g., arranging the dimensions of OFM 606 as KPQ×N).

Figure 6A:
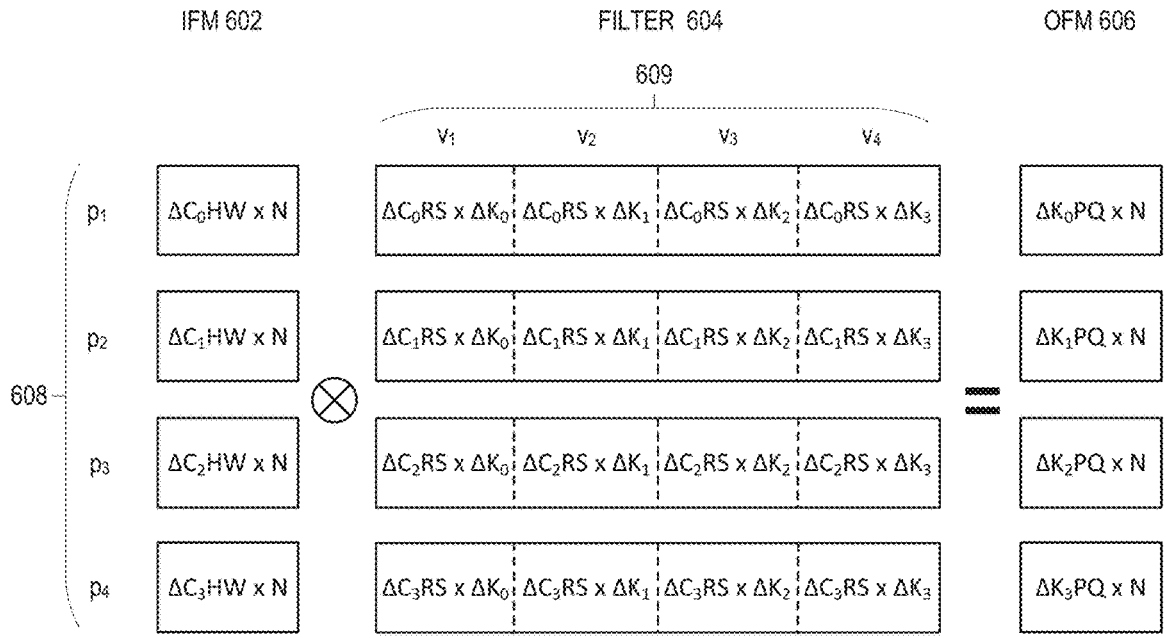
FIGS. 6A-G and 7A-F illustrate example neural network operations associated with convolutions.

FIG. 6A illustrates the process of partitioning the forward propagation operation among the available processing resources. For example, in some embodiments, the matrix operands of a forward propagation operation may be partitioned in order to distribute the forward propagation operation across a variable number of processing resources, as described throughout this disclosure.

In some embodiments, the operands of a forward propagation operation may be partitioned into a number of partitions corresponding to the number of available processing resources. For example, if there are P processing resources available to perform the operation, the input feature matrix (IFM) 602 and filter 604 may be partitioned into P partitions. Moreover, in some embodiments, the P partitions may be across any of the various dimensions of the matrix operands, such as the channels (C), images (N), and/or filters (K). Each partition may then be distributed to a particular processing resource, as described throughout this disclosure.

In the illustrated example, the matrix operands are partitioned for distribution across four processing resources. Accordingly, IFM 602 and filter 604 are partitioned into four partitions $p_1$-$p_4$ (designated by label 608) corresponding to the four processing resources. Moreover, in some embodiments, partitions $p_1$-$p_4$ of filter 604 may be further partitioned into virtual partitions $v_1$-$v_4$ (designated by label 609). Virtual partitions $v_1$-$v_4$, for example, may simply be further sub-partitions of partitions $p_1$-$p_4$, which are respectively used in different stages of a forward propagation operation. Moreover, the partitions of IFM 602 and filter 604 are across the channels (C) and filters (K) dimensions. Each partition $p_1$-$p_4$ may then be distributed to a particular matrix processing resource. For example, partition $p_1$ of IFM 602 and filter 604 may be distributed to a first matrix processing resource, partition $p_2$ of IFM 602 and filter 604 may be distributed to a second matrix processing resource, and so forth.

Moreover, in some embodiments, matrix operands may be partitioned hierarchically based on the hierarchical arrangement of processing resources. For example, as described above regarding the matrix processing architecture of FIGS. 2A-2C, matrix processing system 200 may include a hierarchy of processing resources 210, including multiple matrix processing chips 220, multiple high bandwidth memory (HBM) modules 240 on each matrix processing chip 220, multiple matrix processing clusters 230 on each matrix processing chip 220, and/or multiple matrix processing units (MPUs) 234 on each matrix processing cluster 230. Accordingly, in some embodiments, matrix operands may be partitioned at the multi-chip level, the multi-HBM level, and/or the multi-cluster level.

At the multi-chip level, the matrix operands may initially be partitioned based on the number of available matrix processing chips (e.g., matrix processing chips 220 of FIG. 2A). The partitions at the multi-chip level may be across any of the various dimensions of the matrix operands, such as the channels (C), images (N), and/or filters (K) dimensions. Each partition, and the associated partial matrix operations, may then be distributed to a particular matrix processing chip.

At the multi-HBM level, the partition and partial matrix operations distributed to a particular matrix processing chip may then be similarly partitioned and distributed across various "logical processing nodes" of that matrix processing chip. A "logical processing node" of a matrix processing chip may include, for example, a group of matrix processing clusters and an associated high-bandwidth memory (HBM) module. For example, matrix processing chip 220 of FIG. 2B includes twelve matrix processing clusters 230 and four high bandwidth memory (HBM) modules 240. Thus, matrix processing chip 220 may be treated as having four logical processing nodes, where each logical processing node includes three matrix processing clusters 230 and an associated high bandwidth memory (HBM) module 240. Accordingly, at the multi-HBM level for a chip such as matrix processing chip 220, the partition and partial matrix operations distributed to that chip may then be similarly partitioned and distributed across the four logical processing nodes of that matrix processing chip. The partitions at the multi-HBM level may be across any of the various dimensions of the matrix operands, such as the channels (C), images (N), and/or filters (K) dimensions.

At the multi-cluster level, the partition and partial matrix operations distributed to a particular logical processing node may then be similarly partitioned and distributed across the matrix processing clusters of that logical processing node (e.g., a group of three matrix processing clusters 230 in FIG. 2B), and across the matrix processing units (MPUs) of each matrix processing cluster (e.g., matrix processing units (MPUs) 234 of FIG. 2C). The partitions at the multi-cluster level may be across any of the various dimensions of the matrix operands, such as the channels (C), and/or filters (K). Moreover, at the multi-cluster level, the partial matrix operations may be distributed across the height (P) and width (Q) of the output feature matrix (OFM) 606. For example, in some embodiments, a logical processing node may include three matrix processing clusters, and each matrix processing cluster may include two matrix processing units (MPUs). Accordingly, a partial matrix operation distributed to the logical processing node may be distributed to the three matrix processing clusters across the height (P) of OFM 606, and the partial matrix operation distributed to each matrix processing cluster may then be distributed to the two matrix processing units (MPUs) across the width (Q) of OFM 606.

The forward propagation operation may then be performed as described in connection with FIGS. 6B-6G.

Figure 6B:
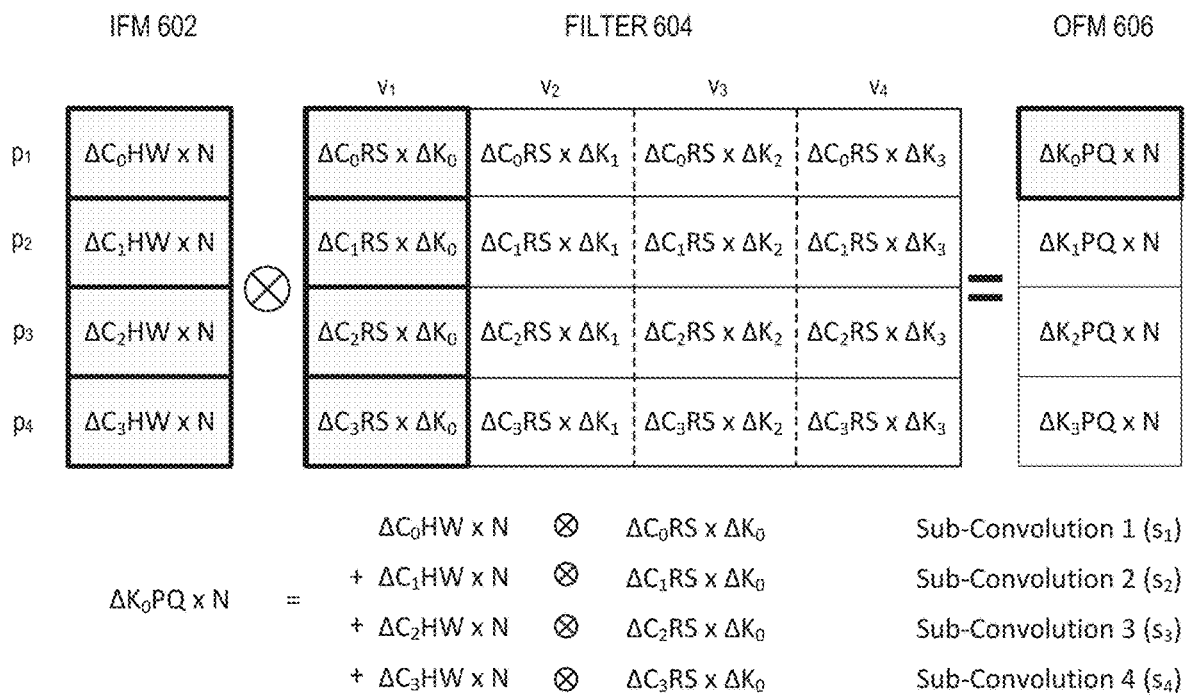

FIG. 6B illustrates one of four partial calculations that are performed in parallel to determine the result of the forward propagation operation. For example, the result of the forward propagation operation is determined by performing various partial calculations that are each used to calculate a partial result of the forward propagation operation. For example, when the forward propagation operation is complete, each partial result of the forward propagation operation will be stored in partitions $p_1$-$p_4$ of output feature matrix (OFM) 606, as illustrated in FIG. 6B. For example, as illustrated in FIG. 6B, partition $p_1$ of OFM 606 corresponds to partial result $\Delta K_0 PQ \times N$; partition $p_2$ of OFM 606 corresponds to partial result $\Delta K_1 PQ \times N$; partition $p_3$ of OFM 606 corresponds to partial result $\Delta K_2 PQ \times N$; and partition $p_4$ of OFM 606 corresponds to partial result $\Delta K_3 PQ \times N$.

The partial results of OFM 606 are determined using the following partial calculations:

$1^{st}$ partial calculation: partial result $\Delta K_0 PQ \times N$ (partition $p_1$ of OFM 606)=convolution of IFM 602 and virtual partition $v_1$ of filter 604;

$2^{nd}$ partial calculation: partial result $\Delta K_1 PQ \times N$ (partition $p_2$ of OFM 606)=convolution of IFM 602 and virtual partition $v_2$ of filter 604;

$3^{rd}$ partial calculation: partial result $\Delta K_2 PQ \times N$ (partition $p_3$ of OFM 606)=convolution of IFM 602 and virtual partition $v_3$ of filter 604; and $4^{th}$ partial calculation: partial result $\Delta K_3 PQ \times N$ (partition $p_4$ of OFM 606)=convolution of IFM 602 and virtual partition $v_4$ of filter 604.

FIG. 6B illustrates the $1^{st}$ partial calculation above, which is used to determine the partial result corresponding to partition $p_1$ of OFM 606 (e.g., partial result $\Delta K_0 PQ \times N$). For example, as illustrated in FIG. 6B, the $1^{st}$ partial calculation is a convolution of input feature matrix (IFM) 602 and the first virtual partition $v_1$ of filter 604, and the result of the calculation is the partial result corresponding to partition $p_1$ of OFM 606 (e.g., partial result $\Delta K_0 PQ \times N$).

In the illustrated example, the $1^{st}$ partial calculation (e.g., for the partial result corresponding to partition $p_1$ of OFM 606) is broken down as the sum of four sub-convolutions $s_1$-$s_4$ (where the asterisks (*) represent a convolution operation):

$s_1$: $\Delta C_0 HW \times N * \Delta C_0 RS \times \Delta K_0$
$s_2$: $\Delta C_1 HW \times N * \Delta C_1 RS \times \Delta K_0$
$s_3$: $\Delta C_2 HW \times N * \Delta C_2 RS \times \Delta K_0$
$s_4$: $\Delta C_3 HW \times N * \Delta C_3 RS \times \Delta K_0$ These four sub-convolutions $s_1$-$s_4$ are then performed in four stages, as described further in connection with FIGS. 6C-6F. Moreover, although not illustrated throughout FIGS. 6B-6F, the remaining partial calculations identified above (e.g., the $2^{nd}$-$4^{th}$ partial calculations for the partial results corresponding to partitions $p_2$-$p_4$ of OFM 606) may be executed in parallel and in a similar manner as the $1^{st}$ partial calculation.

For example, in the first stage, sub-convolution $s_4$ of the $1^{st}$ partial calculation is performed by a first processing resource. Moreover, during this stage, the other processing resources may be performing sub-convolutions associated with the other partial calculations identified above. In the second stage, sub-convolution $s_3$ of the $1^{st}$ partial calculation is performed by a second processing resource, and while that sub-convolution is being performed, the result of sub-convolution $s_4$ is transmitted from the first processing resource to the second processing resource. When the second processing resource completes sub-convolution $s_3$, it calculates the sum of $s_4$ and $s_3$. Moreover, during this stage, the other processing resources may be performing similar operations associated with the other partial calculations identified above. In the third stage, sub-convolution $s_2$ of the $1^{st}$ partial calculation is performed by a third processing resource, and while that sub-convolution is being performed, the sum of $s_4$ and $s_3$ is transmitted from the second processing resource to the third processing resource. When the third processing resource completes sub-convolution $s_2$, it calculates the sum of $s_4$, $s_3$, and $s_2$. Moreover, during this stage, the other processing resources may be performing similar operations associated with the other partial calculations identified above. In the fourth stage, sub-convolution $s_1$ of the $1^{st}$ partial calculation is performed by a fourth processing resource, and while that sub-convolution is being performed, the sum of $s_4$, $s_3$, and $s_2$ is transmitted from the third processing resource to the fourth processing resource. When the fourth processing resource completes sub-convolution $s_1$, it calculates the sum of $s_4$, $s_3$, $s_2$, and $s_1$, which is the final result of the $1^{st}$ partial calculation (e.g., the partial result corresponding to partition $p_1$ of OFM 606). Similarly, during this stage, the other processing resources may be performing similar operations associated with the other partial calculations identified above, and thus may obtain the partial results corresponding to partitions $p_2$-$p_4$ of OFM 606.

Figure 6C:
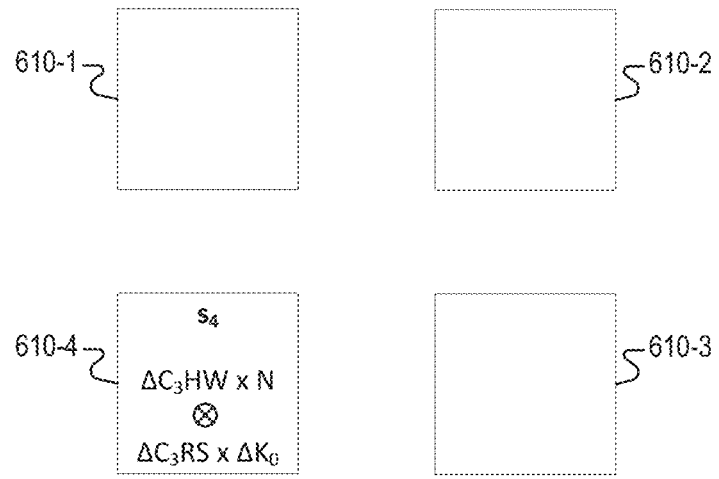

FIG. 6C illustrates stage 1 of the $1^{st}$ partial calculation from FIG. 6B. As discussed above in connection with FIG. 6A, the matrix operands have been partitioned into four partitions corresponding to the four available processing resources. In the illustrated example of FIG. 6C, the four available processing resources are processing resources 610-1 to 610-4. Processing resources 610, for example, could be any of the processing resources 210 of matrix processing system 200 from FIGS. 2A-2C, such as matrix processing chips 220, logical processing nodes, and/or matrix processing clusters 230, among other examples. For example, at the multi-chip level, processing resources 610 could be matrix processing chips; at the multi-HBM level, processing resources 610 could be logical processing nodes (e.g., groups of matrix processing clusters 230 and an associated HBM module 240); and at the multi-cluster level, processing resources 610 could be matrix processing clusters.

Although not illustrated, partitions $p_1$-$p_4$ of the matrix operands have been distributed across processing resources 610-1 to 610-4 (e.g., $p_1$ to processing resource 610-1, $p_2$ to processing resource 610-2, and so forth), as described above in connection with FIG. 6A. Accordingly, partition $p_4$ of the matrix operands has been distributed to processing resource 610-4.

In the illustrated example of stage 1, processing resource 610-4 performs sub-convolution $s_4$ (e.g., $\Delta C_3 HW \times N^* \Delta C_3 RS \times \Delta K_0$) of the $1^{st}$ partial calculation. Moreover, although not illustrated, the processing resources may be performing similar stage 1 operations associated with the other partial calculations identified above in connection with FIG. 6B (e.g., the $2^{nd}$-$4^{th}$ partial calculations).

Figure 6D:
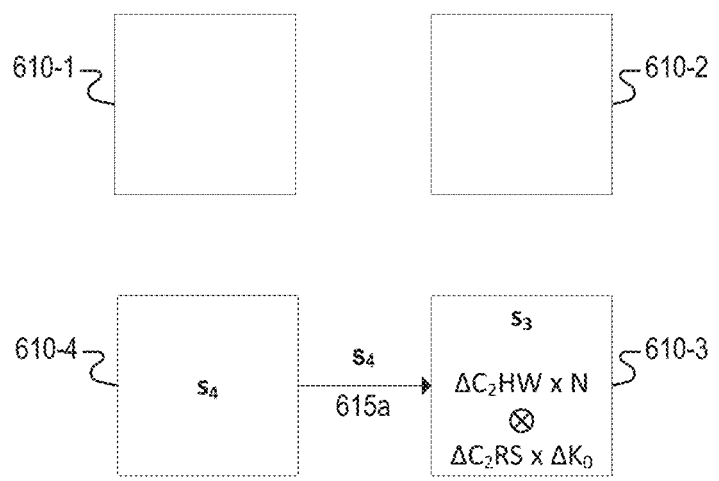

FIG. 6D illustrates stage 2 of the $1^{st}$ partial calculation from FIG. 6B. As discussed above, the matrix operands have been partitioned into four partitions $p_1$-$p_4$, which have been distributed to the four available processing resources 610. Accordingly, although not illustrated, partition $p_3$ of the matrix operands has been distributed to processing resource 610-3.

In the illustrated example of stage 2, processing resource 610-3 performs sub-convolution $s_3$ (e.g., $\Delta C_2 HW \times N^* \Delta C_2 RS \times \Delta K_0$) of the $1^{st}$ partial calculation. Moreover, while processing resource 610-3 is performing sub-convolution $s_3$, processing resource 610-4 transmits the result of sub-convolution $s_4$ (which was computed during the previous stage) to processing resource 610-3 (denoted by label 615a). Moreover, although not illustrated, the processing resources may be performing similar stage 2 operations associated with the other partial calculations identified above in connection with FIG. 6B (e.g., the $2^{nd}$-$4^{th}$ partial calculations).

Figure 6E:
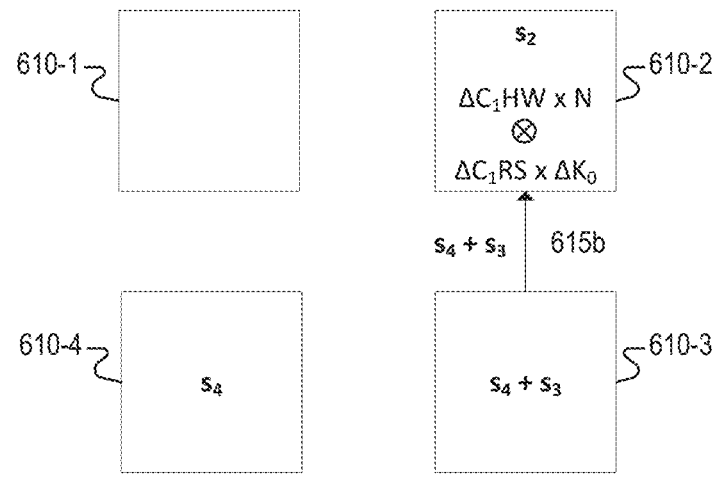

FIG. 6E illustrates stage 3 of the $1^{st}$ partial calculation from FIG. 6B. As discussed above, the matrix operands have been partitioned into four partitions $p_1$-$p_4$, which have been distributed to the four available processing resources 610. Accordingly, although not illustrated, partition $p_2$ of the matrix operands has been distributed to processing resource 610-2.

In the illustrated example of stage 3, processing resource 610-2 performs sub-convolution $s_2$ (e.g., $\Delta C_1 HW \times N^* \Delta C_1 RS \times \Delta K_0$) of the $1^{st}$ partial calculation. Moreover, while processing resource 610-2 is performing sub-convolution $s_2$, processing resource 610-3 transmits the sum of sub-convolutions $s_4$ and $s_3$ (or $s_4+s_3$) to processing resource 610-2 (denoted by label 615b). Moreover, although not illustrated, the processing resources may be performing similar stage 3 operations associated with the other partial calculations identified above in connection with FIG. 6B (e.g., the $2^{nd}$-$4^{th}$ partial calculations).

Figure 6F:
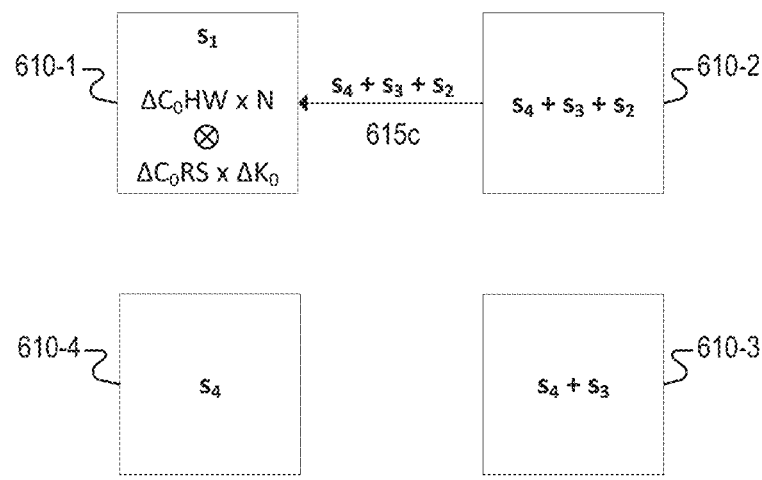

FIG. 6F illustrates stage 4 of the $1^{st}$ partial calculation from FIG. 6B. As discussed above, the matrix operands have been partitioned into four partitions $p_1$-$p_4$, which have been distributed to the four available processing resources 610. Accordingly, although not illustrated, partition $p_1$ of the matrix operands has been distributed to processing resource 610-1.

In the illustrated example of stage 4, processing resource 610-1 performs sub-convolution $s_1$ (e.g., $\Delta C_0 HW \times N^* \Delta C_0 RS \times \Delta K_0$) of the $1^{st}$ partial calculation. Moreover, while processing resource 610-1 is performing sub-convolution $s_1$, processing resource 610-2 transmits the sum of sub-convolutions $s_4$, $s_3$, and $s_2$ (or $s_4+s_3+s_2$) to processing resource 610-1 (denoted by label 615c). Moreover, although not illustrated, the processing resources may be performing similar stage 4 operations associated with the other partial calculations identified above in connection with FIG. 6B (e.g., the $2^{nd}$-$4^{th}$ partial calculations).

Figure 6G:
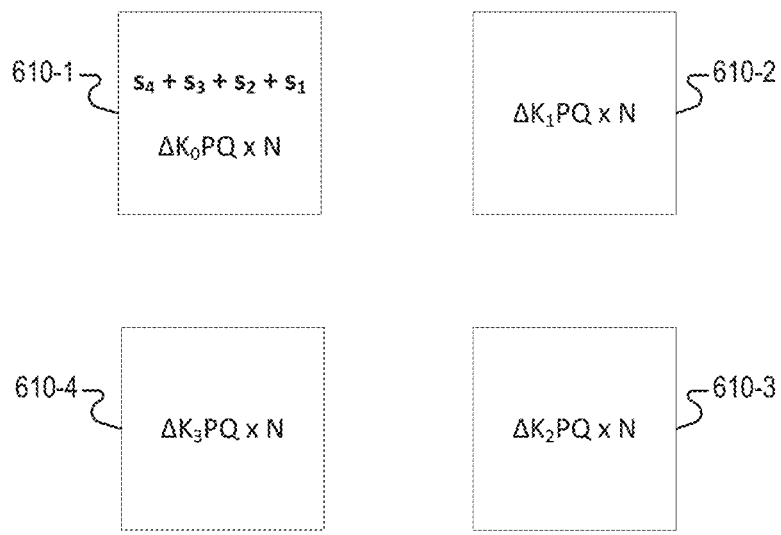

FIG. 6G illustrates the result of the forward propagation operation after all stages have been completed.

After all stages are complete, processing resource 610-1 contains the partial result of the $1^{st}$ partial calculation from FIG. 6B. For example, processing resource 610-1 contains the sum of sub-convolutions $s_4$, $s_3$, $s_2$, and $s_1$ (or $s_4+s_3+s_2+s_1$) of the $1^{st}$ partial calculation, which is the partial result corresponding to the first partition $p_1$ of OFM 606 in FIG. 6A (e.g., $\Delta K_0 PQ \times N$). Moreover, although not illustrated, during stages 1-4 of FIGS. 6C-6F, processing resources 610 performed similar operations in parallel for the other partial calculations identified above in connection with FIG. 6B (e.g., the $2^{nd}$-$4^{th}$ partial calculations).

Accordingly, when all stages have been completed, each processing resource 610 contains one of the partial results of OFM 606 from FIG. 6A. For example, as shown in the illustrated example of FIG. 6G, processing resource 610-1 has the partial result ($\Delta K_0 PQ \times N$) corresponding to the first partition $p_1$ of OFM 606 in FIG. 6A; processing resource 610-2 has the partial result ($\Delta K_1 PQ \times N$) corresponding to the second partition $p_2$ of OFM 606 in FIG. 6A; processing resource 610-3 has the partial result ($\Delta K_2 PQ \times N$) corresponding to the third partition $p_3$ of OFM 606 in FIG. 6A; and processing resource 610-4 has the partial result ($\Delta K_3 PQ \times N$) corresponding to the fourth partition $p_4$ of OFM 606 in FIG. 6A. Accordingly, the result of the forward propagation operation (e.g., OFM 606) now includes all four partial results, and thus the forward propagation operation is complete.

FIGS. 7A-F illustrate an example weight update operation in a neural network. The illustrated weight update operation is implemented using the following formula (where the asterisk (*) represents a weight update operation): IFM1 [CHW×N]*IFM2[KPQ×N]=OFM[CRS×K]. Thus, in the illustrated weight update operation, a weight update is performed using a first input feature matrix 701 (IFM1) and a second input feature matrix 702 (IFM2) to generate an output feature matrix 703. In some embodiments, for example, IFM1 701 may correspond to the output of a backward propagation operation, IFM2 702 may correspond to the output of a forward propagation operation, and OFM 703 may correspond to an updated weight matrix with adjusted weight values to minimize the error associated with forward propagation operations. For example, in some embodiments, the illustrated weight update operation may be used to generate an updated filter for convolutions associated with forward propagation operations in a neural network.

Figure 7A:
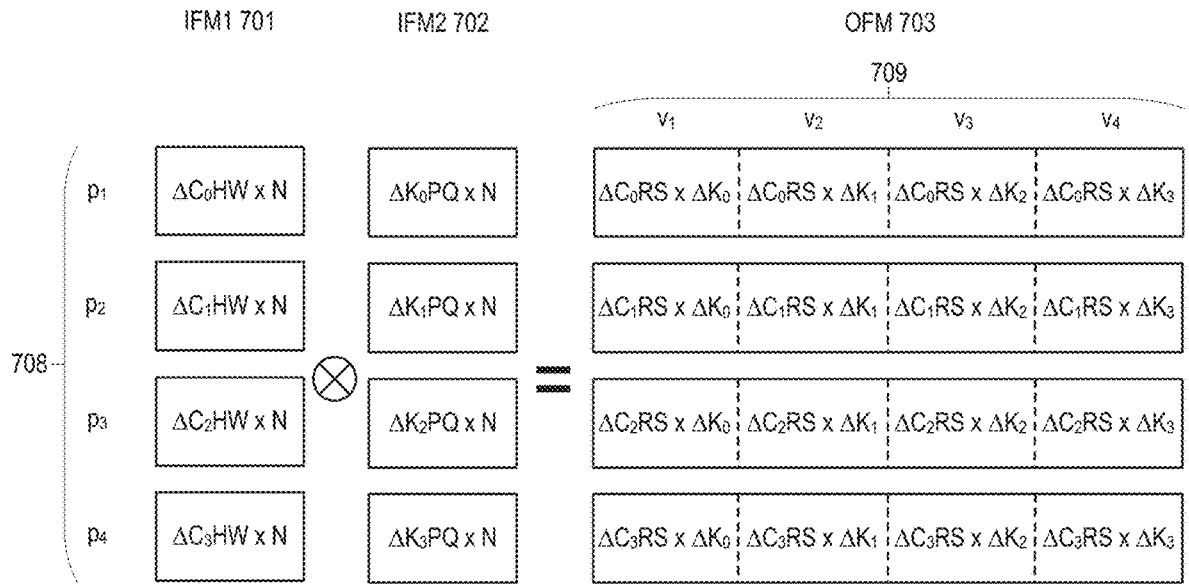

FIG. 7A illustrates the process of partitioning the weight update operation among the available processing resources. For example, in some embodiments, the matrix operands of a weight update operation may be partitioned in order to distribute the weight update operation across a variable number of processing resources, as described throughout this disclosure.

In some embodiments, the operands of a weight update operation may be partitioned into a number of partitions corresponding to the number of available processing resources. For example, if there are P processing resources available to perform the weight update operation, IFM1 701 and IFM2 702 may be partitioned into P partitions. Moreover, in some embodiments, the P partitions may be across any of the various dimensions of the matrix operands, such as the channels (C), images (N), and/or filters (K) dimensions. Each partition may then be distributed to a particular processing resource, as described throughout this disclosure.

In the illustrated example, the matrix operands are partitioned for distribution across four processing resources. Accordingly, IFM1 701 and IFM2 702 are partitioned into four partitions $p_1$-$p_4$ (designated by label 708) corresponding to the four processing resources. Moreover, the partitions of IFM1 701 and IFM2 702 are across the channels (C) and filters (K) dimensions. Each partition $p_1$-$p_4$ may then be distributed to a particular matrix processing resource. For example, partition $p_1$ of IFM1 701 and IFM2 702 may be distributed to a first matrix processing resource, partition $p_2$ of IFM1 701 and IFM2 702 may be distributed to a second matrix processing resource, and so forth.

Moreover, each processing resource then performs various stages of partial matrix operations to compute various partial results of the output feature matrix (OFM) 703. The partial results from these partial matrix operations are stored in partitions $p_1$-$p_4$ (and virtual partitions $v_1$-$v_4$) of OFM 703, as illustrated in FIG. 7A. For example, in the illustrated example, OFM 703 is partitioned into partitions $p_1$-$p_4$ and virtual partitions $v_1$-$v_4$ (as designated by labels 708 and 709). Partitions $p_1$-$p_4$ of OFM 703 are each stored by a different processing resource, while virtual partitions $v_1$-$v_4$ are simply further sub-partitions of a partition $p_1$-$p_4$ stored by a particular processing resource.

Moreover, in some embodiments, matrix operands may be partitioned and distributed hierarchically based on the hierarchical arrangement of processing resources, as described above in connection with FIG. 6A. For example, at the multi-chip level, the matrix operation and operands may be partitioned and distributed across the available matrix processing chips. At the multi-HBM level, partial matrix operations and operands distributed to a particular matrix processing chip may be partitioned and distributed across the "logical processing nodes" of that matrix processing chip. Finally, at the multi-cluster level, partial matrix operations and operands distributed to a particular logical processing node may be partitioned and distributed across the matrix processing clusters of the logical processing node, and/or across the matrix processing units (MPUs) of each matrix processing cluster. Moreover, the partitions of the matrix operands may be across any of the various dimensions of the matrix operands, such as the channels (C), images (N), and/or filters (K) dimensions. In addition, the partial matrix operations may be distributed across the height (P) and width (Q) of output feature matrix (OFM) 703.

The weight update operation may then be performed as described in connection with FIGS. 7B-7F.

Figure 7B:
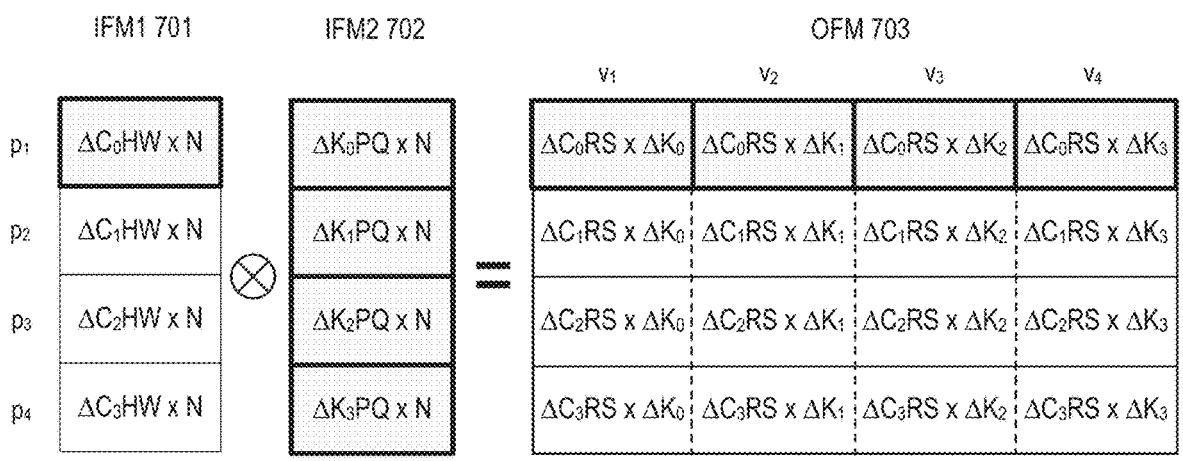

FIG. 7B illustrates one of four partial weight update operations that are performed in parallel to determine the result of the weight update operation. For example, the result of the weight update operation is determined by performing various partial weight update operations that are each used to calculate a partial result of the weight update operation. The partial results from these partial weight update operations are stored in partitions $p_1$-$p_4$ (and partitions $v_1$-$v_4$) of output feature matrix (OFM) 703, as illustrated in FIG. 7B. For example, each partial weight update operation is further broken down into four partial matrix calculations, and the result of each partial matrix calculation is stored in virtual partitions $v_1$-$v_4$ of a particular partition $p_1$-$p_4$ of OFM 703. In the illustrated example, partitions $p_1$-$p_4$ of OFM 703 are each stored by a different processing resource, while virtual partitions $v_1$-$v_4$ are simply further sub-partitions of a partition $p_1$-$p_4$ stored by a particular processing resource. When the partial weight update operations are complete, the result of the weight update operation will be stored in OFM 703, as illustrated in FIG. 7B.

The result of the weight update operation is determined using the following partial weight update operations (where an asterisk (*) represents a partial weight update operation):

$1^{st}$ partial weight update operation: $\Delta C_0 HW \times N$ ($p_1$ of IFM1 701)*KPQ×N (IFM2 702)=$\Delta C_0 RS \times K$ ($p_1$ of OFM 703);

$2^{nd}$ partial weight update operation: $\Delta C_1 HW \times N$ ($p_2$ of IFM1 701)*KPQ×N (IFM2 702)=$\Delta C_1 RS \times K$ ($p_2$ of OFM 703);

$3^{rd}$ partial weight update operation: $\Delta C_2 HW \times N$ ($p_3$ of IFM1 701)*KPQ×N (IFM2 702)=$\Delta C_2 RS \times K$ ($p_3$ of OFM 703); and $4^{th}$ partial weight update operation: $\Delta C_3 HW \times N$ ($p_4$ of IFM1 701)*KPQ×N (IFM2 702)=$\Delta C_3 RS \times K$ ($p_4$ of OFM 703).

FIG. 7B illustrates the $1^{st}$ partial weight update operation above. For example, as illustrated in FIG. 7B, the $1^{st}$ partial weight update operation is implemented using partial input matrix $\Delta C_0 HW \times N$ (e.g., partition $p_1$ of IFM1 701) and input matrix KPQ×N (e.g., IFM2 702) to generate partial result matrix $\Delta C_0 RS \times K$ (e.g., the partial result corresponding to partition $p_1$ of OFM 703). Moreover, the $1^{st}$ partial weight update operation is further broken down into four partial matrix calculations, and the result of each partial matrix calculation is stored in virtual partitions $v_1$-$v_4$ of partition $p_1$ of OFM 703. Although not illustrated, the remaining partial weight update operations (identified above as the $2^{nd}$-$4^{th}$ partial weight update operations) are each similarly broken down into four partial matrix calculations.

The entire weight update operation (including all associated partial weight update operations and partial matrix calculations) is then performed in four stages, as described further in connection with FIGS. 7C-7F.

Figure 7C:
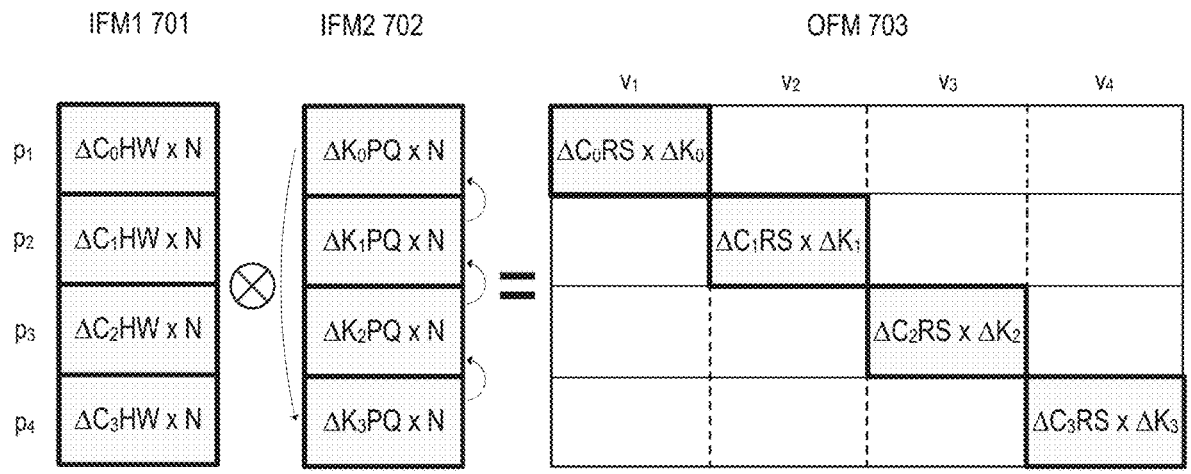

FIG. 7C illustrates stage 1 of the weight update operation. As discussed above in connection with FIG. 7A, the matrix operands have been partitioned into four partitions $p_1$-$p_4$ corresponding to the four available processing resources. Thus, each partition $p_1$-$p_4$ of IFM1 701 and IFM2 702 has been distributed to a particular processing resource. For example, a first processing resource has partition $p_1$ of IFM1 701 and IFM2 702, a second processing resource has partition $p_2$ of IFM1 701 and IFM2 702, a third processing resource has partition $p_3$ of IFM1 701 and IFM2 702, and a fourth processing resource has partition $p_4$ of IFM1 701 and IFM2 702.

Accordingly, in stage 1 of the weight update operation, each processing resource performs a partial matrix calculation using its respective partitions of IFM1 701 and IFM2 702, as illustrated in FIG. 7C and described further below. In some embodiments, for example, the partial matrix calculation performed by each processing resource (represented by asterisks (*) in the discussion below) may be a matrix multiplication operation.

The first processing resource performs the following partial matrix calculation using the matrix operands on partition $p_1$ of IFM1 701 and IFM2 702: $\Delta C_0 HW \times N * \Delta K_0 PQ \times N = \Delta C_0 RS \times \Delta K_0$. The result is stored in the corresponding location of OFM 703 (e.g., on partition $p_1, v_1$ of OFM 703).

The second processing resource performs the following partial matrix calculation using the matrix operands on partition $p_2$ of IFM1 701 and IFM2 702: $\Delta C_1 HW \times N * \Delta K_1 PQ \times N = \Delta C_1 RS \times \Delta K_1$. The result is stored in the corresponding location of OFM 703 (e.g., on partition $p_2, v_2$ of OFM 703).

The third processing resource performs the following partial matrix calculation using the matrix operands on partition $p_3$ of IFM1 701 and IFM2 702: $\Delta C_2 HW \times N * \Delta K_2 PQ \times N = \Delta C_2 RS \times \Delta K_2$. The result is stored in the corresponding location of OFM 703 (e.g., on partition $p_3, v_3$ of OFM 703).

Finally, the fourth processing resource performs the following partial matrix calculation using the matrix operands on partition $p_4$ of IFM1 701 and IFM2 702: $\Delta C_3 HW \times N * \Delta K_3 PQ \times N = \Delta C_3 RS \times \Delta K_3$. The result is stored in the corresponding location of OFM 703 (e.g., on partition $p_4, v_4$ of OFM 703).

Moreover, while the partial matrix calculations are being performed by the processing resources in stage 1, each processing resource simultaneously sends and receives partial matrix operands to and from its neighbor processing resources. For example, in some embodiments, the processing resources may be configured in a single-cyclical arrangement (e.g., with unidirectional communication between neighboring processing resources) or a dual-cyclical arrangement (e.g., with bi-directional communication between neighboring processing resources). In a single-cyclical configuration, each processing resource either sends to, or receives from, each neighbor processing resource. In a dual-cyclical configuration, each processing resource may send and receive to and from each neighbor processing resource. Accordingly, for some operations, a dual-cyclical configuration may reduce the latency for communicating matrix operands, thus avoiding any idle processing time.

Accordingly, using a cyclical configuration (e.g., single-cyclical, dual-cyclical, or any other cyclical-based configuration), the partitions $p_1$-$p_4$ of IFM2 702 are shifted across the processing resources during each stage of the weight update operation. In the illustrated examples of FIGS. 7C-F, a single-cyclical configuration is used. Accordingly, each processing resource sends its partition $p_x$ of IFM2 702 to a neighbor processing resource, and receives a partition $p_x$ of IFM2 702 from another neighbor processing resource. In other embodiments, a dual-cyclical configuration may be used, which may reduce the latency in half for communicating partial matrix operands for certain matrix operations. For example, using a dual-cyclical approach, each processing resource sends its partition $p_x$ of IFM2 702 to both of its neighbor processing resources, and receives a partition $p_x$ of IFM2 702 from both of its neighbor processing resources.

In this manner, during each stage of the weight update operation, partial matrix operands (e.g., partitions $p_1$-$p_4$ of IFM2 702) are shifted across the processing resources to and from their respective neighboring processing resource(s). For example, in FIG. 7C, the partial matrix operands of IFM2 702 are shifted as follows:

The $4^{th}$ processing resource sends its partition of IFM2 702 (e.g., $\Delta K_3 PQ \times N$) to the $3^{rd}$ processing resource (e.g., the matrix operand in partition $p_4$ of IFM2 702 is shifted up to partition $p_3$ of IFM2 702).

The $3^{rd}$ processing resource sends its partition of IFM2 702 (e.g., $\Delta K_2 PQ \times N$) to the $2^{nd}$ processing resource (e.g., the matrix operand in partition $p_3$ of IFM2 702 is shifted up to partition $p_2$ of IFM2 702).

The $2^{nd}$ processing resource sends its partition of IFM2 702 (e.g., $\Delta K_1 PQ \times N$) to the $1^{st}$ processing resource (e.g., the matrix operand in partition $p_2$ of IFM2 702 is shifted up to partition $p_1$ of IFM2 702).

The $1^{st}$ processing resource sends its partition of IFM2 702 (e.g., $\Delta K_0 PQ \times N$) to the $4^{th}$ processing resource (e.g., the matrix operand in partition $p_1$ of IFM2 702 is shifted down to partition $p_4$ of IFM2 702).

Each processing resource may then use the partial matrix operands received from neighboring processing resource(s) in subsequent stages, as described below in connection with FIGS. 7D-F.

Figure 7D:
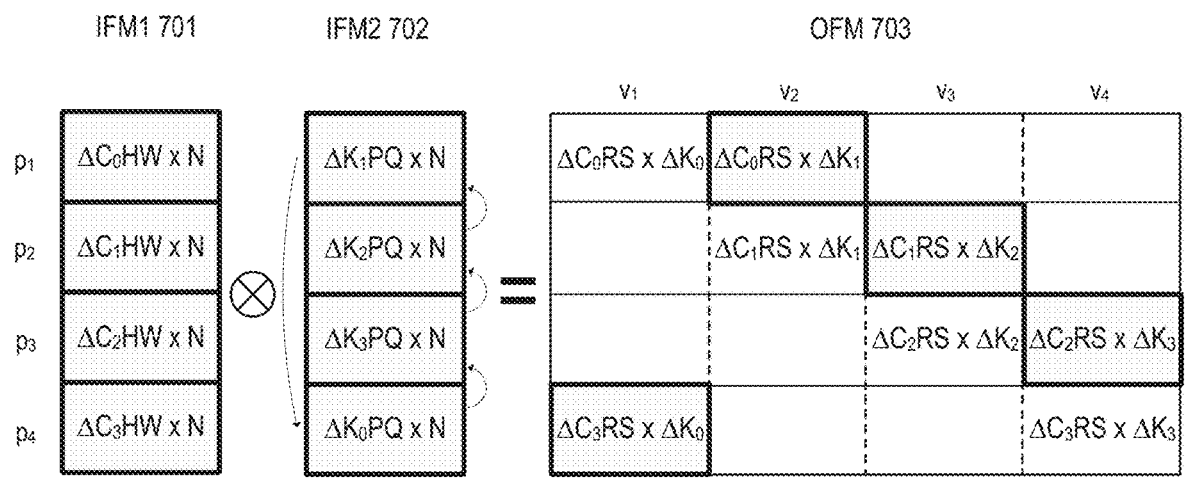

FIG. 7D illustrates stage 2 of the weight update operation. As described above in connection with stage 1 of FIG. 7C, the partitions of IFM2 702 were shifted across the processing resources during stage 1 of the weight update operation. Accordingly, in stage 2 of the weight update operation, each processing resource performs a partial matrix calculation using its respective partitions of IFM1 701 and IFM2 702, as illustrated in FIG. 7D and described further below. In some embodiments, for example, the partial matrix calculation performed by each processing resource (represented by asterisks (*) in the discussion below) may be a matrix multiplication operation.

The first processing resource performs the following partial matrix calculation using the matrix operands on partition $p_1$ of IFM1 701 and IFM2 702: $\Delta C_0 HW \times N * \Delta K_1 PQ \times N = \Delta C_0 RS \times \Delta K_1$. The result is stored in the corresponding location of OFM 703 (e.g., on partition $p_1, v_2$ of OFM 703).

The second processing resource performs the following partial matrix calculation using the matrix operands on partition $p_2$ of IFM1 701 and IFM2 702: $\Delta C_1 HW \times N * \Delta K_2 PQ \times N = \Delta C_1 RS \times \Delta K_2$. The result is stored in the corresponding location of OFM 703 (e.g., on partition $p_2, v_3$ of OFM 703).

The third processing resource performs the following partial matrix calculation using the matrix operands on partition $p_3$ of IFM1 701 and IFM2 702: $\Delta C_2 HW \times N*$\Delta K_3$PQ×N=$\Delta C_2$RS×$\Delta K_3$. The result is stored in the corresponding location of OFM 703 (e.g., on partition $p_3,v_4$ of OFM 703).

Finally, the fourth processing resource performs the following partial matrix calculation using the matrix operands on partition $p_4$ of IFM1 701 and IFM2 702: $\Delta C_3$HW× N*$\Delta K_0$PQ×N=$\Delta C_3$RS×$\Delta K_0$. The result is stored in the corresponding location of OFM 703 (e.g., on partition $p_4,v_1$ of OFM 703).

Moreover, while the processing resources are performing the partial matrix calculations in stage 2, each processing resource simultaneously sends and receives partitions of IFM2 702 to and from its neighbor processing resources. Accordingly, during stage 2 of the weight update operation, the partitions of IFM2 702 are shifted across the processing resources, in a similar manner as described for stage 1 of FIG. 7C (e.g., using single-cyclical, dual-cyclical, or other cyclical-based configurations). For example, in FIG. 7D, the partial matrix operands of IFM2 702 are shifted as follows:
- The $4^{th}$ processing resource sends its partition of IFM2 702 (e.g., $\Delta K_0$PQ×N) to the $3^{rd}$ processing resource (e.g., the matrix operand in partition $p_4$ of IFM2 702 is shifted up to partition $p_3$ of IFM2 702).
- The $3^{rd}$ processing resource sends its partition of IFM2 702 (e.g., $\Delta K_3$PQ×N) to the $2^{nd}$ processing resource (e.g., the matrix operand in partition $p_3$ of IFM2 702 is shifted up to partition $p_2$ of IFM2 702).
- The $2^{nd}$ processing resource sends its partition of IFM2 702 (e.g., $\Delta K_2$PQ×N) to the $1^{st}$ processing resource (e.g., the matrix operand in partition $p_2$ of IFM2 702 is shifted up to partition $p_1$ of IFM2 702).
- The $1^{st}$ processing resource sends its partition of IFM2 702 (e.g., $\Delta K_1$PQ×N) to the $4^{th}$ processing resource (e.g., the matrix operand in partition $p_1$ of IFM2 702 is shifted down to partition $p_4$ of IFM2 702).

Each processing resource may then use the partial matrix operands received from neighboring processing resource(s) in subsequent stages, as described below in connection with FIGS. 7E-F.

Figure 7E:
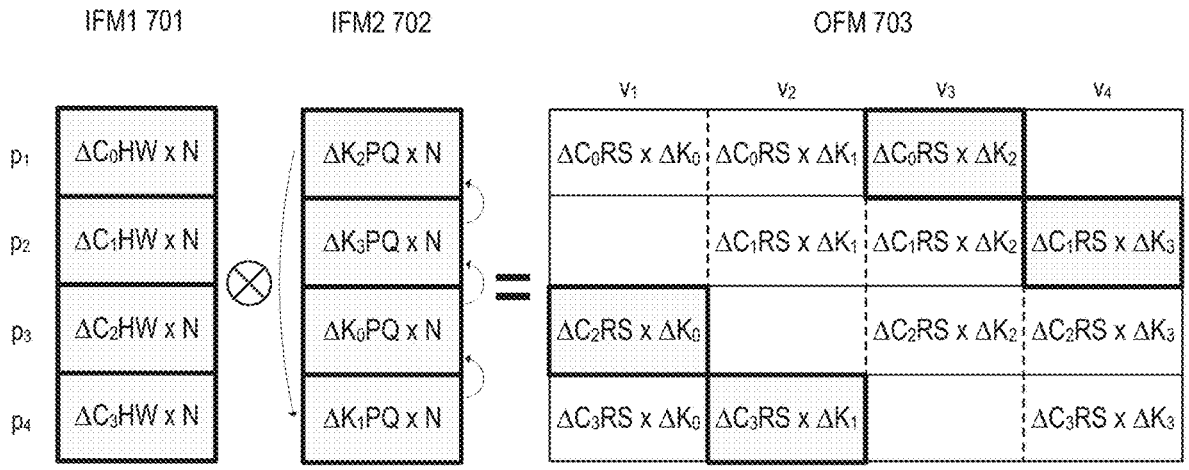

FIG. 7E illustrates stage 3 of the weight update operation. As described above in connection with stage 2 of FIG. 7D, the partitions of IFM2 702 were shifted across the processing resources during stage 2 of the weight update operation. Accordingly, in stage 3 of the weight update operation, each processing resource performs a partial matrix calculation using its respective partitions of IFM1 701 and IFM2 702, as illustrated in FIG. 7E and described further below. In some embodiments, for example, the partial matrix calculation performed by each processing resource (represented by asterisks (*) in the discussion below) may be a matrix multiplication operation.

The first processing resource performs the following partial matrix calculation using the matrix operands on partition $p_1$ of IFM1 701 and IFM2 702: $\Delta C_0$HW× N*$\Delta K_2$PQ×N=$\Delta C_0$RS×$\Delta K_2$. The result is stored in the corresponding location of OFM 703 (e.g., on partition $p_1,v_3$ of OFM 703).

The second processing resource performs the following partial matrix calculation using the matrix operands on partition $p_2$ of IFM1 701 and IFM2 702: $\Delta C_1$HW× N*$\Delta K_3$PQ×N=$\Delta C_1$RS×$\Delta K_3$. The result is stored in the corresponding location of OFM 703 (e.g., on partition $p_2,v_4$ of OFM 703).

The third processing resource performs the following partial matrix calculation using the matrix operands on partition $p_3$ of IFM1 701 and IFM2 702: $\Delta C_2$HW×

N*$\Delta K_0$PQ×N=$\Delta C_2$RS×$\Delta K_0$. The result is stored in the corresponding location of OFM 703 (e.g., on partition $p_3,v_1$ of OFM 703).

Finally, the fourth processing resource performs the following partial matrix calculation using the matrix operands on partition $p_4$ of IFM1 701 and IFM2 702: $\Delta C_3$HW× N*$\Delta K_1$PQ×N=$\Delta C_3$RS×$\Delta K_1$. The result is stored in the corresponding location of OFM 703 (e.g., on partition $p_4,v_2$ of OFM 703).

Moreover, while the processing resources are performing the partial matrix calculations in stage 3, each processing resource simultaneously sends and receives partitions of IFM2 702 to and from its neighbor processing resources. Accordingly, during stage 3 of the weight update operation, the partitions of IFM2 702 are shifted across the processing resources, in a similar manner as described for stages 1 and 2 of FIGS. 7C-D (e.g., using single-cyclical, dual-cyclical, or other cyclical-based configurations). For example, in FIG. 7E, the partial matrix operands of IFM2 702 are shifted as follows:
- The $4^{th}$ processing resource sends its partition of IFM2 702 (e.g., $\Delta K_1$PQ×N) to the $3^{rd}$ processing resource (e.g., the matrix operand in partition $p_4$ of IFM2 702 is shifted up to partition $p_3$ of IFM2 702).
- The $3^{rd}$ processing resource sends its partition of IFM2 702 (e.g., $\Delta K_0$PQ×N) to the $2^{nd}$ processing resource (e.g., the matrix operand in partition $p_3$ of IFM2 702 is shifted up to partition $p_2$ of IFM2 702).
- The $2^{nd}$ processing resource sends its partition of IFM2 702 (e.g., $\Delta K_3$PQ×N) to the $1^{st}$ processing resource (e.g., the matrix operand in partition $p_2$ of IFM2 702 is shifted up to partition $p_1$ of IFM2 702).
- The $1^{st}$ processing resource sends its partition of IFM2 702 (e.g., $\Delta K_2$PQ×N) to the $4^{th}$ processing resource (e.g., the matrix operand in partition $p_1$ of IFM2 702 is shifted down to partition $p_4$ of IFM2 702).

Each processing resource may then use the partial matrix operands received from neighboring processing resource(s) in subsequent stages, as described below in connection with FIG. 7F.

Figure 7F:
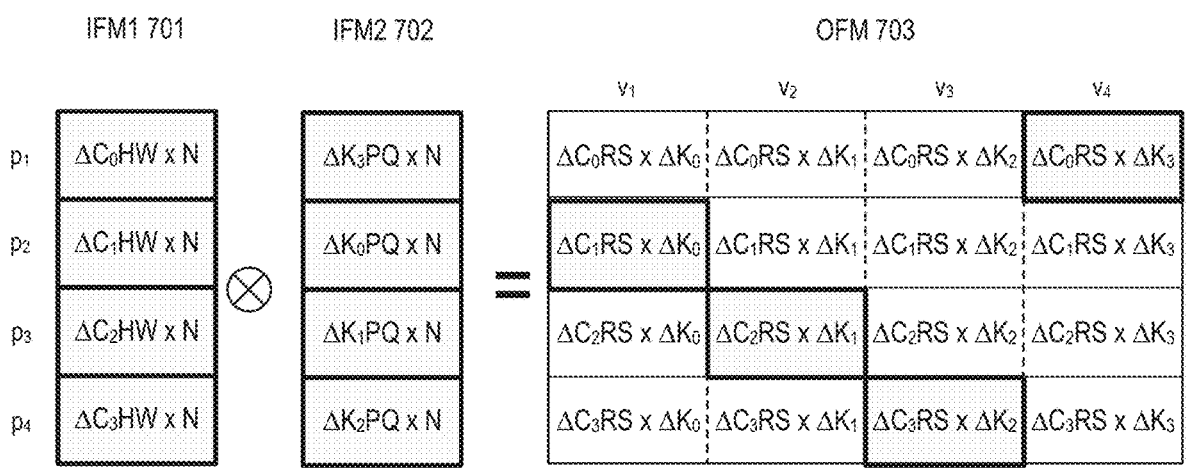

FIG. 7F illustrates stage 4 of the weight update operation. As described above in connection with stage 3 of FIG. 7E, the partitions of IFM2 702 were shifted across the processing resources during stage 3 of the weight update operation. Accordingly, in stage 4 of the weight update operation, each processing resource performs a partial matrix calculation using its respective partitions of IFM1 701 and IFM2 702, as illustrated in FIG. 7F and described further below. In some embodiments, for example, the partial matrix calculation performed by each processing resource (represented by asterisks (*) in the discussion below) may be a matrix multiplication operation.

The first processing resource performs the following partial matrix calculation using the matrix operands on partition $p_1$ of IFM1 701 and IFM2 702: $\Delta C_0$HW× N*$\Delta K_3$PQ×N=$\Delta C_0$RS×$\Delta K_3$. The result is stored in the corresponding location of OFM 703 (e.g., on partition $p_l,v_4$ of OFM 703).

The second processing resource performs the following partial matrix calculation using the matrix operands on partition $p_2$ of IFM1 701 and IFM2 702: $\Delta C_1$HW× N*$\Delta K_0$PQ×N=$\Delta C_1$RS×$\Delta K_0$. The result is stored in the corresponding location of OFM 703 (e.g., on partition $p_2,v_l$ of OFM 703).

The third processing resource performs the following partial matrix calculation using the matrix operands on partition $p_3$ of IFM1 701 and IFM2 702: $\Delta C_2$HW×

$N * \Delta K_1 PQ \times N = \Delta C_2 RS \times \Delta K_1$. The result is stored in the corresponding location of OFM 703 (e.g., on partition $p_3, v_2$ of OFM 703).

Finally, the fourth processing resource performs the following partial matrix calculation using the matrix operands on partition $p_4$ of IFM1 701 and IFM2 702: $\Delta C_3 HW \times N * \Delta K_2 PQ \times N = \Delta C_3 RS \times \Delta K_2$. The result is stored in the corresponding location of OFM 703 (e.g., on partition $p_4, v_3$ of OFM 703).

After the partial matrix calculations of stage 4 are complete, all partial results of the weight update operation have been calculated and are stored in OFM 703. Accordingly, the weight update operation is complete.

Figure 8:
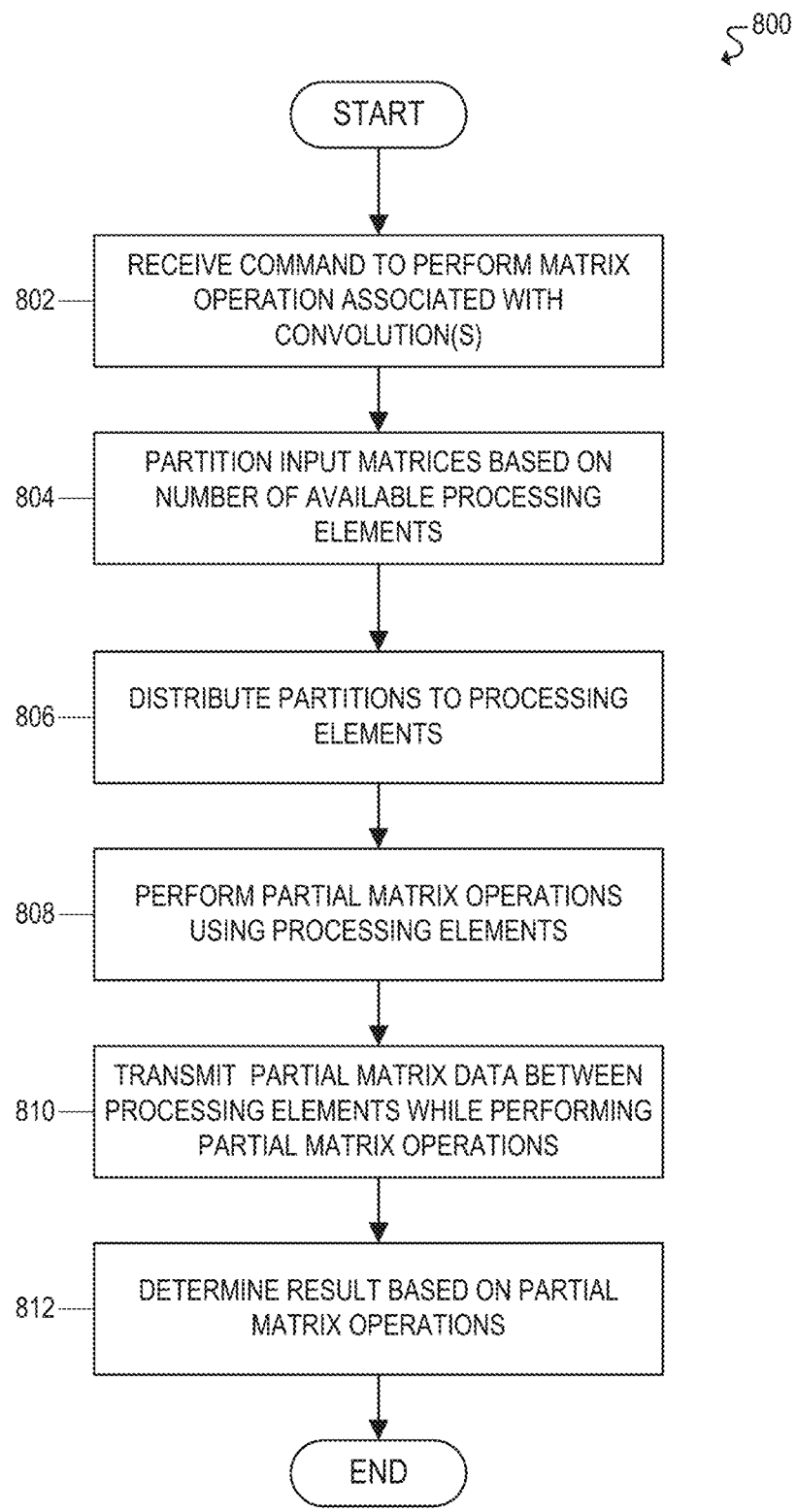
FIG. 8 illustrates a flowchart for an example embodiment of distributed matrix operations associated with convolutions.

FIG. 8 illustrates a flowchart 800 for an example embodiment of distributed matrix operations associated with convolutions. Flowchart 800 may be implemented, in some embodiments, by components described throughout this disclosure (e.g., the matrix processing architecture of FIGS. 2A-C).

The flowchart may begin at block 802 by receiving a command to perform a matrix operation. The matrix operation, for example, may comprise an operation on a plurality of input matrices (e.g., matrix operands). Moreover, the matrix operation may be associated with one or more convolution operations.

Convolution operations, for example, may be used for image processing. For example, a convolution operation may involve applying a filter to an image. The filter may be used to modify the image (e.g., applying visual effects), detect certain features in the image (e.g., facial recognition or identification of other objects), and so forth. Moreover, in some embodiments, the image and filter of a convolution operation may be represented using matrices. For example, a color image may be represented by a three-dimensional (3D) matrix with dimensions corresponding to the number of channels (C), height (H), and width (W) of the image. Similarly, a filter may be represented by a 3D matrix with dimensions corresponding to the number of channels (C), height (R), and width (S) of the filter. In these embodiments, a convolution operation may be performed by moving the filter throughout the image and computing the dot product between the filter and the various portions of the image. Moreover, in some embodiments, when convolution operations need to be performed on multiple images and using multiple filters, the images may be processed together to increase processing efficiency. Thus, in some embodiments, a collection of images may be represented using a four-dimensional (4D) matrix, with dimensions corresponding to the number of channels (C), image height (H), image width (W), and number of images (N). Similarly, a collection of filters may be represented using a 4D matrix, with dimensions corresponding to the number of filters (K), number of channels (C), filter height (R), and filter width (S). Accordingly, a convolution operation may then be performed using the 4D matrices that are used to represent the images and filters.

In some embodiments, convolution operations may be used to implement computer vision artificial intelligence and machine learning capabilities in an artificial neural network. For example, in some embodiments, the matrix operation of block 802 may be associated with operations in an artificial neural network, such as forward propagation, backward propagation, and/or weight update operations.

The flowchart may then proceed to block 804 to partition the input matrices into a plurality of partitions based on the number of available processing elements. In some embodiments, the input matrices may be partitioned based on the hierarchical arrangement of processing resources, as described further in connection with block 806. In some embodiments, the partitions may be across any of the various dimensions of the input matrices, such as the channels (C), images (N), and/or filters (K) dimensions.

The flowchart may then proceed to block 806 to distribute the partitions to the available processing elements. For example, in some embodiments, each partition may be distributed to a particular processing element. Moreover, in some embodiments, the processing elements may be configured in a hierarchical arrangement with a plurality of processing levels, and the matrix operation may be distributed across the hierarchy of processing levels. For example, in some embodiments, the processing elements may include multiple matrix processing chips (e.g., matrix processing chips 220 of FIG. 2A), multiple high bandwidth memory (HBM) modules on each matrix processing chip (e.g., HBM modules 240 of FIG. 2B), multiple matrix processing clusters on each matrix processing chip (e.g., matrix processing clusters 230 of FIG. 2B), and/or multiple matrix processing units (MPUs) on each matrix processing cluster (e.g., MPUs 234 of FIG. 2C). In those embodiments, the matrix operation may first be partitioned and distributed across the matrix processing chips. The partial matrix operation distributed to a particular matrix processing chip may then be similarly partitioned and distributed across the matrix processing clusters and/or high bandwidth memory (HBM) modules of the particular matrix processing chip. For example, in some cases, the partial matrix operation may be distributed across the matrix processing clusters of the matrix processing chip. Alternatively, the partial matrix operation may first be distributed across various "logical processing nodes" of the matrix processing chip (e.g., groups of matrix processing clusters associated with an HBM module), and may then be distributed across the matrix processing clusters of a particular logical processing node. The partition and partial matrix operation distributed to a particular matrix processing cluster may then be similarly partitioned and distributed across the matrix processing units (MPUs) of the particular matrix processing cluster.

Moreover, in some cases, a partial matrix operation distributed to a particular processing element may be distributed across the height (P) and width (Q) of the corresponding output of the partial matrix operation. For example, a partial matrix operation distributed to a logical processing node may be distributed to the associated matrix processing clusters across the height (P) of the output matrix, and the partial matrix operation distributed to each matrix processing cluster may then be distributed to the matrix processing units (MPUs) across the width (Q) of the output matrix.

The flowchart may then proceed to block 808 to perform partial matrix operations using the processing elements. For example, each processing element may perform a partial matrix operation based on the matrix data distributed to that processing element.

The flowchart may then proceed to block 810 to transmit partial matrix data between processing elements while performing the partial matrix operations. For example, in some embodiments, the processing elements may be configured in a cyclical arrangement such that each processing element is communicatively coupled to multiple neighbor processing elements. Moreover, the partial matrix operations may be performed in a plurality of stages, and each processing element may transmit partial matrix data to its neighbor processing elements while performing a particular stage of the partial matrix operations. For example, in some embodiments, each processing element may transmit partial matrix data to one of its neighbor processing elements (e.g., using a single-cyclical approach) or to both of its neighbor processing elements (e.g., using a dual-cyclical approach) during each stage of partial matrix operations. For example, a first processing element may use or calculate partial matrix data in a particular stage of the partial matrix operations, the first processing element may transmit the partial matrix data to a second processing element, and the second processing element may then use the partial matrix data in a subsequent stage of the partial matrix operations. For some matrix operations, the partial matrix data may include a partial input matrix, while for other matrix operations, the partial matrix data may include a partial result matrix.

The flowchart may then proceed to block 812 to determine a result of the matrix operation. For example, the result of the matrix operation may be determined based on the partial results collectively computed by the processing elements.

At this point, the flowchart may be complete. In some embodiments, however, the flowchart may restart and/or certain blocks may be repeated. For example, in some embodiments, the flowchart may restart at block 802 to continue receiving and processing commands to perform matrix operations.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also matrix processors, graphics processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a plurality of memory elements to store matrix data; and a plurality of processing elements to perform a matrix operation using a plurality of input matrices, wherein the matrix operation is associated with one or more convolution operations; wherein the plurality of processing elements is configured to: partition the plurality of input matrices into a plurality of input partitions, wherein the plurality of input matrices is partitioned based on a number of available processing elements; distribute the plurality of input partitions among the plurality of processing elements, wherein each input partition is distributed to a particular processing element of the plurality of processing elements; perform a plurality of partial matrix operations using the plurality of processing elements; transmit partial matrix data between the plurality of processing elements while performing the plurality of partial matrix operations; and determine a result of the matrix operation based on the plurality of partial matrix operations.

In one example embodiment of an apparatus: the plurality of processing elements is configured in a hierarchical arrangement comprising a plurality of processing levels; and the plurality of processing elements is further configured to distribute the matrix operation across the plurality of processing levels.

In one example embodiment of an apparatus, the plurality of input matrices comprises matrix data associated with one or more images and one or more filters, wherein the one or more images are associated with one or more channels.

In one example embodiment of an apparatus, the plurality of processing elements is further configured to partition the plurality of input matrices based on one or more of: a number of channels associated with the one or more images; a number of filters; and a number of images.

In one example embodiment of an apparatus, the plurality of processing elements is further configured to distribute the plurality of partial matrix operations among the plurality of processing elements based on a height and a width of the result of the matrix operation.

In one example embodiment of an apparatus: the plurality of processing elements is configured in a cyclic arrangement such that each processing element is communicatively coupled to a plurality of neighbor processing elements; and the plurality of processing elements is further configured to: perform the plurality of partial matrix operations in a plurality of stages; and transmit a portion of the partial matrix data from each processing element to one or more of the neighbor processing elements while performing a particular stage of the partial matrix operations.

In one example embodiment of an apparatus, the partial matrix data comprises a partial input matrix, wherein the partial input matrix is to be used by a first processing element in a particular stage of the partial matrix operations, and wherein the partial input matrix is to be used by a second processing element in a subsequent stage of the partial matrix operations.

In one example embodiment of an apparatus, the partial matrix data comprises a partial result matrix determined by a first processing element in a particular stage of the partial matrix operations, and wherein the partial result matrix is to be used by a second processing element in a subsequent stage of the partial matrix operations.

In one example embodiment of an apparatus, the plurality of processing elements comprises: a plurality of matrix processing chips; a plurality of logical processing nodes associated with each matrix processing chip; and a memory element and a plurality of matrix processing clusters associated with each logical processing node.

In one example embodiment of an apparatus, the matrix operation is associated with a weight update operation in a neural network.

In one example embodiment of an apparatus, the matrix operation is associated with a forward propagation operation in a neural network.

In one example embodiment of an apparatus, the matrix operation is associated with a backward propagation operation in a neural network.

One or more embodiments may include a method, comprising: performing a matrix operation using a plurality of input matrices, wherein the matrix operation is associated with one or more convolution operations, and wherein performing the matrix operation comprises: partitioning the plurality of input matrices into a plurality of input partitions, wherein the plurality of input matrices is partitioned based on a number of available processing elements; distributing the plurality of input partitions among a plurality of processing elements, wherein each input partition is distributed to a particular processing element of the plurality of processing elements; performing a plurality of partial matrix operations using the plurality of processing elements; transmitting partial matrix data between the plurality of processing elements while performing the plurality of partial matrix operations; and determining a result of the matrix operation based on the plurality of partial matrix operations.

In one example embodiment of a method: the plurality of processing elements is configured in a hierarchical arrangement comprising a plurality of processing levels; and the matrix operation is distributed across the plurality of processing levels.

In one example embodiment of a method, the plurality of processing elements comprises: a plurality of matrix processing chips; a plurality of logical processing nodes associated with each matrix processing chip; and a memory element and a plurality of matrix processing clusters associated with each logical processing node.

In one example embodiment of a method, the plurality of input matrices comprises matrix data associated with one or more images and one or more filters, wherein the one or more images are associated with one or more channels.

In one example embodiment of a method, the plurality of input matrices is further partitioned based on one or more of: a number of channels associated with the one or more images; a number of filters; and a number of images.

In one example embodiment of a method, the method further comprises distributing the plurality of partial matrix operations to the plurality of processing elements based on a height and a width of the result of the matrix operation.

In one example embodiment of a method, the plurality of processing elements is configured in a cyclic arrangement such that each processing element is communicatively coupled to a plurality of neighbor processing elements.

In one example embodiment of a method, the plurality of partial matrix operations is performed in a plurality of stages, and wherein each processing element transmits a portion of the partial matrix data to one or more of the neighbor processing elements while performing a particular stage of the partial matrix operations.

In one example embodiment of a method, the partial matrix data comprises a partial input matrix, wherein the partial input matrix is used by a first processing element in a particular stage of the partial matrix operations, and wherein the partial input matrix is used by a second processing element in a subsequent stage of the partial matrix operations.

In one example embodiment of a method, the matrix operation is associated with a weight update operation in a neural network.

In one example embodiment of a method, the partial matrix data comprises a partial result matrix determined by a first processing element in a particular stage of the partial matrix operations, and wherein the partial result matrix is used by a second processing element in a subsequent stage of the partial matrix operations.

In one example embodiment of a method, the matrix operation is associated with a forward propagation operation in a neural network.

In one example embodiment of a method, the matrix operation is associated with a backward propagation operation in a neural network.

One or more embodiments may include a system, comprising: a plurality of memory elements to store matrix data; a plurality of processing elements to perform a matrix operation using a plurality of input matrices, wherein the matrix operation is associated with one or more convolution operations, and wherein the plurality of processing elements comprises: a host processor; one or more matrix processing chips; a plurality of matrix processors associated with the one or more matrix processing chips; wherein the plurality of processing elements is configured to: partition the plurality of input matrices into a plurality of input partitions, wherein the plurality of input matrices is partitioned based on a number of available processing elements; distribute the plurality of input partitions among the plurality of processing elements, wherein each input partition is distributed to a particular processing element of the plurality of processing elements; perform a plurality of partial matrix operations using the plurality of processing elements; transmit partial matrix data between the plurality of processing elements while performing the plurality of partial matrix operations; and determine a result of the matrix operation based on the plurality of partial matrix operations.

In one example embodiment of a system, the system further comprises a communication interface to communicate with one or more remote matrix processing chips over a communication network.

One or more embodiments may include at least one machine accessible storage medium having instructions stored thereon, the instructions, when executed on a machine, cause the machine to: perform a matrix operation using a plurality of input matrices, wherein the matrix operation is associated with one or more convolution operations, and wherein the instructions that cause the machine to perform the matrix operation further cause the machine to: partition the plurality of input matrices into a plurality of input partitions, wherein the plurality of input matrices is partitioned based on a number of available processing elements; distribute the plurality of input partitions among a plurality of processing elements, wherein each input partition is distributed to a particular processing element of the plurality of processing elements; perform a plurality of partial matrix operations using the plurality of processing elements; transmit partial matrix data between the plurality of processing elements while performing the plurality of partial matrix operations; and determine a result of the matrix operation based on the plurality of partial matrix operations.

In one example embodiment of a storage medium, the plurality of input matrices comprises matrix data associated with one or more images and one or more filters, wherein the one or more images are associated with one or more channels.

In one example embodiment of a storage medium, the instructions further cause the machine to partition the plurality of input matrices based on one or more of: a number of channels associated with the one or more images; a number of filters; and a number of images.

In one example embodiment of a storage medium, the instructions further cause the machine to distribute the plurality of partial matrix operations to the plurality of processing elements based on a height and a width of the result of the matrix operation.

In one example embodiment of a storage medium, the plurality of processing elements is configured in a cyclic arrangement such that each processing element is communicatively coupled to a plurality of neighbor processing elements.

In one example embodiment of a storage medium, the instructions further cause the machine to: perform the plurality of partial matrix operations in a plurality of stages; and transmit a portion of the partial matrix data from each processing element to one or more of the neighbor processing elements while performing a particular stage of the partial matrix operations.

What is claimed is:

1. An apparatus, comprising:
   interface circuitry;
   a matrix processing cluster (MPC) circuitry, communicatively coupled to the interface circuitry, the MPC circuitry including:
      memory resource block circuitry to store a plurality of input matrices;
      a plurality of matrix processing units (MPUs), wherein each MPU includes processing circuitry to perform matrix arithmetic;
      master control central processing unit (MCC) circuitry to distribute a matrix instruction, received from a controller via the interface circuitry, across the plurality of matrix processing units (MPUs), wherein the matrix instruction is to perform a neural network operation on the plurality of input matrices, wherein the neural network operation includes a plurality of convolution operations;
      slicing engine circuitry to partition the plurality of input matrices into a plurality of input partitions based on a number of available MPUs;
      the MCC circuitry to distribute the plurality of input partitions among the plurality of MPUs, wherein each input partition is distributed to a particular MPU of the plurality of MPUs, wherein the MCC circuitry to shift each input partition to a different MPU of the plurality of MPUs between each of a plurality of stages of the matrix operation; and
      at least two or more of the plurality of MPUs to perform a plurality of partial matrix operations in the plurality of stages including at least a first partial matrix operation in a first stage by a first MPU using a first input partition and a second partial matrix operation in the first stage by a second MPU using a second input partition, and including at least a third partial matrix operation in a stage subsequent to the first stage by the first MPU using the second input partition and a fourth partial matrix operation in a stage subsequent to the first stage by the second MPU using the first input partition, wherein the first and second input partitions are shifted between at least the first and second MPUs during one or more weight update operations; and
   the controller to determine a result of the neural network operation based on the plurality of partial matrix operations.

2. The apparatus of claim 1, wherein the plurality of input matrices includes matrix data associated with one or more images and one or more filters, wherein the one or more images are associated with one or more channels.

3. The apparatus of claim 2, wherein the slicing engine circuitry to partition the plurality of input matrices into the plurality of input partitions based on the number of available MPUs is further to partition the plurality of input matrices based on one or more of:
   a number of channels associated with the one or more images;
   a number of filters; and
   a number of images.

4. The apparatus of claim 1, wherein the MCC circuitry is further to distribute the plurality of partial matrix operations among the plurality of MPUs based on a height and a width of the result of the neural network operation.

5. The apparatus of claim 1, wherein:
   the plurality of MPUs is configured in a cyclic arrangement such that each MPU is communicatively coupled to a plurality of neighbor MPUs;
   the MCC circuitry to transmit, via the interface circuitry, the partial matrix data between the plurality of MPUs while performing the plurality of partial matrix operations is further to transmit a portion of the partial matrix data from each MPU to one or more of the neighbor MPUs while performing a particular stage of the partial matrix operations.

6. The apparatus of claim 5, wherein the neural network operation is associated with the one or more weight update operations in a neural network.

7. The apparatus of claim 5, wherein the partial matrix data includes a partial result matrix determined by a first MPU in a particular stage of the partial matrix operations, and wherein the partial result matrix is to be used by a second MPU in a subsequent stage of the partial matrix operations.

8. The apparatus of claim 7, wherein the neural network operation is associated with a forward propagation operation in a neural network.

9. The apparatus of claim 7, wherein the neural network operation is associated with a backward propagation operation in a neural network.

10. A method of performing a neural network operation on a matrix processor, comprising:
    distribute a matrix instruction to perform the neural network operation on a plurality of input matrices, wherein the neural network operation includes a plurality of convolution operations;

partitioning the plurality of input matrices into a plurality of input partitions based on a number of available matrix processing units (MPUs) in the matrix processor;

distributing the plurality of input partitions among a plurality of MPUs in the matrix processor, wherein each input partition is distributed to a particular MPU of the plurality of MPUs;

shifting each input partition to a different MPU of the plurality of MPUs between each of a plurality of stages of the matrix operation; and performing a plurality of partial matrix operations in a plurality of stages, including at least a first partial matrix operation in a first stage by a first MPU using a first input partition and a second partial matrix operation in the first stage by a second MPU using a second input partition, and including at least a third partial matrix operation in a stage subsequent to the first stage by the first MPU using the second input partition and a fourth partial matrix operation in a stage subsequent to the first stage by the second MPU using the first input partition, wherein the first and second input partitions are shifted between at least the first and second MPUs during one or more weight update operations; and determining a result of the neural network operation based on the plurality of partial matrix operations.

11. The method of claim 10, wherein:

the plurality of input matrices includes matrix data associated with one or more images and one or more filters, wherein the one or more images are associated with one or more channels; and the plurality of input matrices is further partitioned based on one or more of:
 a number of channels associated with the one or more images;
 a number of filters; and
 a number of images.

12. The method of claim 10, further including distributing the plurality of partial matrix operations to the plurality of MPUs based on a height and a width of the result of the neural network operation.

13. The method of claim 10, wherein the plurality of MPUs is configured in a cyclic arrangement such that each MPU is communicatively coupled to a plurality of neighbor MPUs.

14. The method of claim 13, wherein each MPU transmits a portion of the partial matrix data to one or more of the neighbor MPUs while performing a particular stage of the partial matrix operations.

15. A system, comprising:

memory circuitry to store a plurality of input matrices;

a plurality of matrix processing chips, wherein each matrix processing chip includes a plurality of matrix processing cluster (MPC) circuitries, the plurality of MPC circuitries to each include a plurality of matrix processing units (MPUs) to perform matrix arithmetic;

interface circuitry to communicatively couple the plurality of matrix processing chips; and host processor circuitry to instruct at least one of the plurality of matrix processing chips to perform a neural network operation on the plurality of input matrices, wherein the neural network operation includes a plurality of convolution operations;

the at least one of the plurality of matrix processing chips to:
 partition the plurality of input matrices into a plurality of input partitions based on a number of available MPCs;
 distribute the plurality of input partitions among the plurality of MPC circuitries, wherein each input partition is distributed to a particular MPC circuitry of the plurality of MPC circuitries, wherein the MPC circuitries to shift each input partition to a different MPU of the plurality of MPUs between each of a plurality of stages of the matrix operation;
 perform a plurality of partial matrix operations in a plurality of stages using the plurality of MPUs of each MPC circuitry, including at least a first partial matrix operation in a first stage by a first MPU using a first input partition and a second partial matrix operation in the first stage by a second MPU using a second input partition, and including at least a third partial matrix operation in a stage subsequent to the first stage by the first MPU using the second input partition and a fourth partial matrix operation in a stage subsequent to the first stage by the second MPU using the first input partition, wherein the first and second input partitions are shifted between at least the first and second MPUs during one or more weight update operations; and
 determine a result of the neural network operation based on the plurality of partial matrix operations.

16. The system of claim 15, further including communication interface circuitry to communicate with one or more remote matrix processing chips over a communication network.

17. At least one non-transitory machine accessible storage medium having instructions stored thereon, the instructions, when executed on a machine, cause the machine to:

distribute a matrix instruction to perform the neural network operation on a plurality of input matrices, wherein the neural network operation includes a plurality of convolution operations;

partition the plurality of input matrices into a plurality of input partitions based on a number of available matrix processing units (MPUs) in the matrix processor;

distribute the plurality of input partitions among a plurality of MPUs in the matrix processor, wherein each input partition is distributed to a particular MPU of the plurality of MPUs;

shift each input partition to a different MPU of the plurality of MPUs between each of a plurality of stages of the matrix operation; and perform a plurality of partial matrix operations in a plurality of stages, including at least a first partial matrix operation in a first stage by a first MPU using a first input partition and a second partial matrix operation in the first stage by a second MPU using a second input partition, and including at least a third partial matrix operation in a stage subsequent to the first stage by the first MPU using the second input partition and a fourth partial matrix operation in a stage subsequent to the first stage by the second MPU using the first input partition, wherein the first and second input partitions are shifted between at least the first and second MPUs during one or more weight update operations; and determine a result of the neural network operation based on the plurality of partial matrix operations.

18. The storage medium of claim 17, wherein the plurality of input matrices includes matrix data associated with one or more images and one or more filters, wherein the one or more images are associated with one or more channels.

19. The storage medium of claim 18, wherein the instructions that cause the machine to partition the plurality of input matrices into the plurality of input partitions based on the number of available matrix processing units (MPUs) in the matrix processor further cause the machine to partition the plurality of input matrices based on one or more of:
- a number of channels associated with the one or more images;
- a number of filters; and
- a number of images.

20. The storage medium of claim 17, wherein the instructions further cause the machine to distribute the plurality of partial matrix operations to the plurality of MPUs based on a height and a width of the result of the neural network operation.

21. The storage medium of claim 17, wherein the plurality of MPUs is configured in a cyclic arrangement such that each MPU is communicatively coupled to a plurality of neighbor MPUs.

22. The storage medium of claim 21, wherein:
- the instructions that cause the machine to transmit, via the interface circuitry, the partial matrix data between the plurality of MPUs while performing the plurality of partial matrix operations further cause the machine to transmit a portion of the partial matrix data from each MPU to one or more of the neighbor MPUs while performing a particular stage of the partial matrix operations.

\* \* \* \* \*